(12) United States Patent
Skiles et al.

(10) Patent No.: US 10,963,503 B2
(45) Date of Patent: Mar. 30, 2021

(54) GENERATION OF DOCUMENT CLASSIFIERS

(71) Applicant: SparkCognition, Inc., Austin, TX (US)

(72) Inventors: Erik Skiles, Manor, TX (US); Joshua Bronson, Austin, TX (US); Syed Mohammad Ali, Austin, TX (US); Keith D. Moore, Cedar Park, TX (US)

(73) Assignee: SPARKCOGNITION, INC., Austin, TX (US)

( * ) Notice: Subject to any disclaimer, the term of this patent is extended or adjusted under 35 U.S.C. 154(b) by 185 days.

(21) Appl. No.: 15/615,743

(22) Filed: Jun. 6, 2017

(65) Prior Publication Data

US 2018/0349388 A1    Dec. 6, 2018

(51) Int. Cl.
| | |
|---|---|
| *G06F 16/35* | (2019.01) |
| *G06F 3/0482* | (2013.01) |
| *G06N 20/00* | (2019.01) |
| *G06N 3/08* | (2006.01) |
| *G06N 7/00* | (2006.01) |

(52) U.S. Cl.
CPC .......... *G06F 16/355* (2019.01); *G06F 3/0482* (2013.01); *G06N 3/08* (2013.01); *G06N 20/00* (2019.01); *G06N 7/005* (2013.01)

(58) Field of Classification Search
CPC combination set(s) only.
See application file for complete search history.

(56) References Cited

U.S. PATENT DOCUMENTS

| | | | |
|---|---|---|---|
| 2002/0129015 A1* | 9/2002 | Caudill | G06F 17/3069 |
| 2006/0212142 A1* | 9/2006 | Madani | G06F 17/30707 700/49 |
| 2016/0314184 A1* | 10/2016 | Bendersky | G06F 17/30705 |

* cited by examiner

*Primary Examiner* — James Trujillo
*Assistant Examiner* — Kurt A Mueller
(74) *Attorney, Agent, or Firm* — Moore IP Law

(57) ABSTRACT

A method includes performing, by a computing device, a clustering operation to group documents of a document corpus into clusters in a feature vector space. The document corpus includes one or more labeled documents and one or more unlabeled documents. Each of the one or more labeled documents is assigned to a corresponding class in classification data associated with the document corpus, and each of the one or more unlabeled document is not assigned to any class in the classification data. The method also includes generating, by the computing device, a prompt requesting classification of a particular document of the document corpus, where the particular document is selected based on a distance between the particular document and a labeled document of the one or more labeled documents.

27 Claims, 11 Drawing Sheets

1400

1401
Receive, via a graphical user interface including a plurality of document elements and a plurality of class elements, user input associating a first document element of the plurality of document elements with a first class element of the plurality of class elements, where each document element represents a corresponding document of a plurality of documents and each class element represents a corresponding class of a plurality of classes

1402
Generate a document classifier using supervised training data, the supervised training data indicating, based on the user input, that a first document represented by the first document element is assigned to a first class associated with the first class element

FIG. 14

GENERATION OF DOCUMENT CLASSIFIERS

BACKGROUND

A document classifier is a data model that is used to evaluate documents and assign the documents to one or more categories. The document classifier may be binary, in which case the document classifier assigns each document to one of two categories, generally of the form "A" and "not A." For example, a binary document classifier may assign documents to categories such as "fiction" or "non-fiction." Alternatively, a document classifier may assign documents to one or more of a larger number of categories. For example, a document classifier may sort documents into subject matter categories, such as "biography," "mystery," "geology," "religion," and so forth.

To classify a document, a document classifier generally extracts features from the document, such as information indicating whether a particular word appears in the document or a frequency of appearance of the particular word in the document. Because of the large differences between different data sets and different features that can be extracted from the different data sets, document classifiers are typically custom built by data scientists for a particular data set. For example, data scientists may be employed to identify relevant distinguishing features within a data set, select an appropriate type of data model to classify documents based on the relevant distinguishing features, and build and test the document classifier.

Employing a data scientist to generate a document classifier can be expensive. Additionally, as new classes of documents are added, the document classifier built by the data scientist can become out of date and cease to function reliably, which may entail hiring the data scientist again to update or entirely rework the document classifier. Further, many business and government entities that could benefit from the use of a document classifier maintain records that they consider to be sensitive. For example, medical entities, banking entities, and government entities may each maintain large document collections that include many confidential or access restricted documents. Such entities may be reluctant to (or unable to) give a data scientist access to these sensitive records to build a document classifier.

SUMMARY

Particular implementations of systems and methods to simplify generating and managing (e.g., versioning) document classifiers are described herein. A particular system uses a simple and intuitive graphical user interface (GUI) to enable a user to define classes (e.g., document classes) and to assign documents to the classes. In some implementations, an unsupervised machine learning process, such as clustering, is used to assist users in generating supervised training data to be used to generate a document classifier. For example, a clustering process may be used in selecting documents to be classified, to assist users in identifying potentially distinct classes or sub-classes of documents, or a combination thereof.

Data generated based on document-class assignments provided via the GUI are used as a supervised training data set to build a document classifier, as described further below. The GUI is visually similar to a traditional representation of a file system interface. For example, in the GUI, classes may be represented by folder icons, or similar graphical representations. As another example, if the classes include sub-classes in a hierarchical arrangement, the relationships among classes may be graphically represented using a folder-in-folder arrangement or folder tree.

The GUI may also mimic file system operations to add classes, to delete classes, or to re-arrange relationships among classes. For example, a new class can be added by adding (e.g., using a "new folder" menu option) a new folder corresponding to the new class to the GUI. Similarly, a class can be deleted from by deleting (e.g., using a "delete folder" menu option) a folder corresponding to the class from the GUI. Classes can be re-arranged in the hierarchy using drag-and-drop, move, cut-paste, or copy-paste operations to rearrange folders in the GUI that represent the classes. Thus, users who are able to navigate a relatively simple file system interface are able to define classes for a document classifier.

Further, the GUI may mimic file system operations to manage assignment of documents to particular classes to generate the supervised training data. For example, a user (or multiple users) can assign a document to a class using operations that mimic drag-and-drop, move, cut-paste, or copy-paste operations. To illustrate, the GUI may display a graphical representation of a document (e.g., a thumbnail or icon), and the user may drag the icon to a folder representing a particular class to assign the document to the particular class. If a document is associated with two or more classes, the representation of the document can be dragged and dropped in two or more folders corresponding to the classes.

By representing the classes and documents in a file system-like GUI, the system simplifies user interactions so that extensive model building, training, or data scientists are not needed to build reliable supervised training data. Further, because classifying documents manually may best be performed by users who are familiar with the documents (e.g., how the documents are used and why the documents were generated), improved document classification may result from enabling users who generate and use the documents to assign document classifications. For similar reasons, using the file system-like GUI also simplifies verifying and updating a document classifier, as described further below.

The file-system-like GUI may be generated by a computing device executing a set of instructions that are configured to assist users (especially non-data scientists) with generating a document classifier. In some implementations, the instructions may also be executable to assist the users by recommending documents for classification by the user. For example, the instructions may be executable by the computing device to use an unsupervised machine learning process, such as a clustering process, to help the user decide which documents of a document corpus that the user should manually classify. In this example, using the clustering process to help the user decided which documents to manually classify can improve the performance of a resulting document classifier and can reduce the amount of time and effort users spend classifying documents.

For example, after a user has generated several classes and has assigned documents to those classes, a computing device may use the classes and document assignments to perform a clustering operation. In a particular aspect, the computing device initiates the clustering operation by selecting one or more fixed cluster centers and one or more variable cluster centers. Each fixed cluster center corresponds to a location in a feature vector space of a document that the user assigned to a class (e.g., a labeled document). Each user-defined class may be represented by a corresponding cluster having a fixed cluster center. Thus, the number of clusters having a fixed cluster center corresponds to the number of classes specified by the user.

Each variable cluster center initially corresponds to a location in the feature vector space of a document that the user has not assigned to any class (e.g., an unlabeled document). The number of variable cluster centers may be determined based on user input. For example, the user may be prompted to indicate how many additional documents the user is willing to classify, and the number of variable cluster centers may correspond to the number of additional documents the user is willing to classify.

After initializing the clustering operation, the computing device groups documents of the document corpus into clusters in the feature vector space (e.g., by assigning each document to a cluster associated with a nearest cluster center). As documents are added to clusters, the computing device updates the variable cluster centers, but fixed cluster centers are held constant. After clustering the documents of the document corpus, the computing device prompts the user to classify one or more additional documents. The one or more additional documents are selected based on the clusters to improve operation of a document classifier that is to be generated. For example, a document that is in an area that is distant from a fixed cluster center in the feature vector space and that has a relatively high concentration of unlabeled documents may be selected for classification. The high concentration of unlabeled documents may be indicative of a cluster of related documents. Further, the relatively large distance between the area with the high concentration of unlabeled documents and the fixed cluster center may indicate that the cluster of related documents should be associated with a class that the user has not yet defined. Thus, the clustering operation can facilitate identifying new classes that the user has not yet specified. As another example, a document that is in a boundary region between two clusters may be selected for classification to clarify distinguishing characteristics of the two clusters.

In a particular aspect, a computing device includes a memory storing document classifier generation instructions and a processor configured to execute instructions from the memory. The document classifier generation instructions are executable by the processor to perform operations including performing a clustering operation to group documents of a document corpus into clusters in a feature vector space. The document corpus includes one or more labeled documents and one or more unlabeled documents. Each of the one or more labeled documents is assigned to a corresponding class in classification data associated with the document corpus, and each of the one or more unlabeled document is not assigned to any class in the classification data. The operations also include generating a prompt requesting classification of a particular document of the document corpus, where the particular document is selected based on a distance between the particular document and a labeled document of the one or more labeled documents.

In another particular aspect, a method includes performing, by a computing device, a clustering operation to group documents of a document corpus into clusters in a feature vector space. The document corpus includes one or more labeled documents and one or more unlabeled documents. Each of the one or more labeled documents is assigned to a corresponding class in classification data associated with the document corpus, and each of the one or more unlabeled document is not assigned to any class in the classification data. The method also includes generating, by the computing device, a prompt requesting classification of a particular document of the document corpus, where the particular document is selected based on a distance between the particular document and a labeled document of the one or more labeled documents.

In another particular aspect, a computer readable storage device stores instructions that are executable by a processor to perform operations including performing a clustering operation to group documents of a document corpus into clusters in a feature vector space. The document corpus includes one or more labeled documents and one or more unlabeled documents. Each of the one or more labeled documents is assigned to a corresponding class in classification data associated with the document corpus, and each of the one or more unlabeled document is not assigned to any class in the classification data. The operations also include generating a prompt requesting classification of a particular document of the document corpus, where the particular document is selected based on a distance between the particular document and a labeled document of the one or more labeled documents.

BRIEF DESCRIPTION OF THE DRAWINGS

FIG. 14 is a flowchart illustrating a particular example of a method of generating a document classifier based on user input;

DETAILED DESCRIPTION

Figure 1:
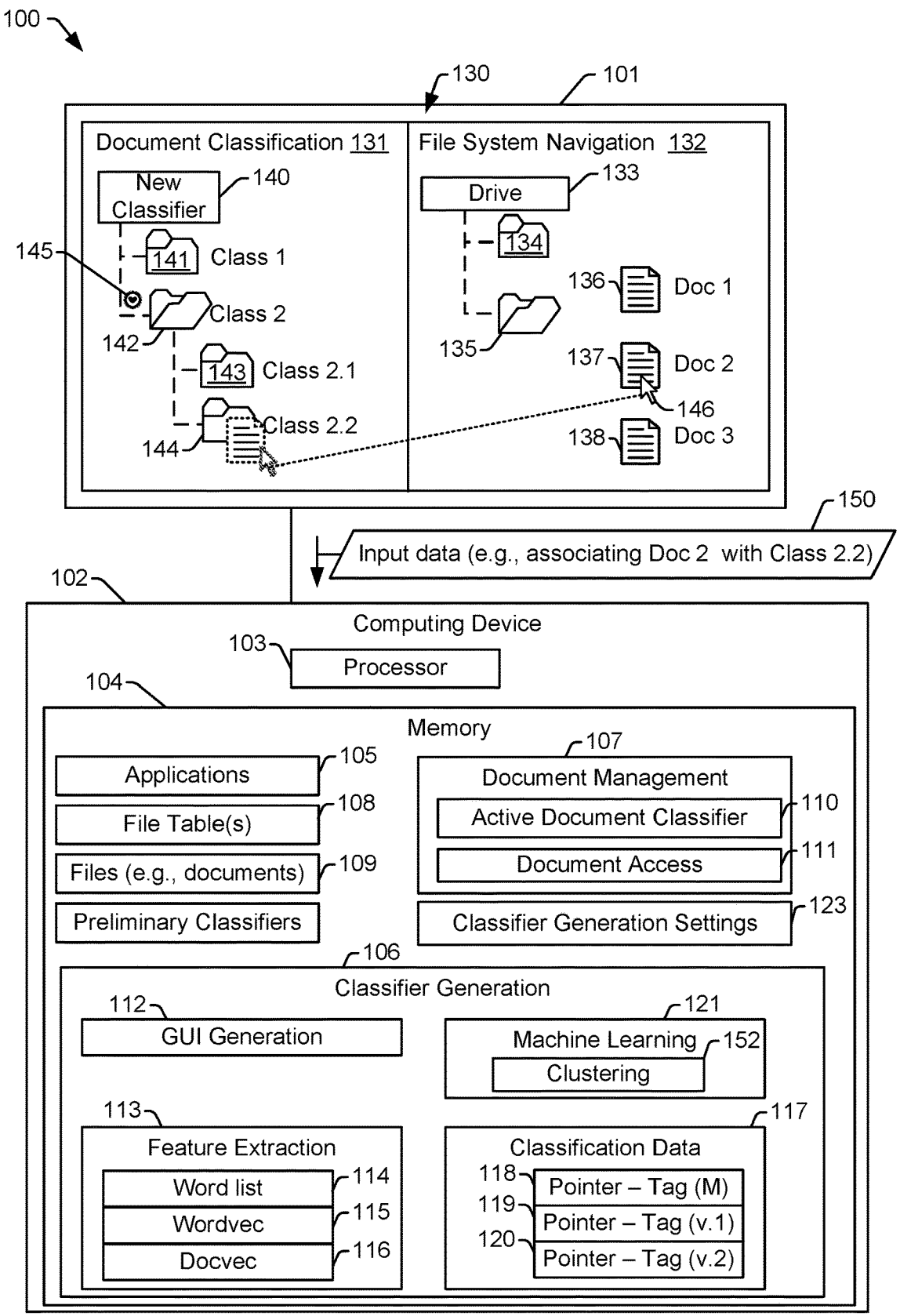
FIG. 1 illustrates a particular example of a system that is operable to generate a document classifier.

FIG. 1 illustrates a particular example of a system 100 that is operable to generate a document classifier. The system 100 includes a display device 101 coupled to a computing device 102. The computing device 102 includes a processor 103 and a memory 104 accessible to the processor 103. The processor 103 is configured to execute instructions from the memory 104 to perform various operations described herein, such as operations to generate a document classifier. For example, as explained further below, the system 100 is configured to use an intuitive graphical user interface (GUI) 130 to enable a user to define classes (e.g., document classes) and to assign documents to the classes. The system 100 may also be configured to use clustering to assist the user with classifying documents by recommending documents for classification, by recommending new classes, or both. The documents assigned to the classes may be used to generate a supervised training data set to build a document classifier.

In the example illustrated in FIG. 1, the memory 104 stores classifier generation instructions 106 and document management instructions 107. The memory 104 may also store one or more other applications 105, such as a file system browser, an internet browser, document generation applications (e.g., a word processor), etc. The memory 104 may also store one or more files 109. For example, the files 109 may include or correspond to at least some of the documents to be classified using a document classifier. In other examples, the files 109 including documents to be classified using a document classifier may be stored at a different memory (not shown) within the computing device 102 or remote from the computing device 102 (e.g., in a remote data store).

The memory 104 may also include file tables 108. The file tables 108 include information to enable navigation though a file system to access the files 109. For example, the file tables 108 may include information such as identifiers of the files 109, data indicating physical storage locations of the files 109, metadata associated with the files 109, an arrangement of folders or other logical storage locations of the file system, etc. The specific content and arrangement of the file tables 108 depends on the file system used to store the files 109.

The classifier generation instructions 106 include GUI generation instructions 112 that are executable by the processor 103 to generate the GUI 130. In the example illustrated in FIG. 1, the GUI 130 includes a document classification portion 131 and a file system navigation portion 132.

The file system navigation portion 132 includes a graphical representation of a portion of the file system. For example, in FIG. 1, the file system navigation portion 132 includes a drive icon 133 identifying a particular storage device for which information is presented. In some implementations, the file system navigation portion 132 may include information for multiple storage devices, including local drives, network drives, networked databases, cloud-storage resources, and internet-based resources. The file system navigation portion 132 also includes folder icons 134, 135 arranged according to a hierarchy of logical storage locations (e.g., folders) associated with the storage device. The file system navigation portion 132 also includes document icons 136-138 representing documents. In FIG. 1, a folder icon 135 is illustrated as "open" indicating that the document icons 136, 137, 138 represent documents in the file system that are associated with a storage location represented by the folder icon 135.

The document classification portion 131 includes a file system like representation of user-defined document classes. For example, each user-defined document class of a new classifier 140 is represented in FIG. 1 by a class element depicted as a folder icon. Thus, a folder icon 141 is a class element representing a class entitled "Class 1", and a folder icon 142 is a class element representing a class entitled "Class 2".

In the particular example illustrated in FIG. 1, one or more of the user-defined classes include sub-classes. The document classification portion 131 represents a relationship among classes and sub-classes using a folder-in-folder scheme. For example, in FIG. 1, the class Class 2 includes several sub-classes entitled "Class 2.1" and "Class 2.2", respectively. The classes Class 2.1 and Class 2.2 are identified as a sub-classes of the class Class 2.0 by the open folder icon 142 representing the class Class 2.0, indentation of the folder icons 143 and 144 representing the classes Class 2.1 and Class 2.2 under the folder icon 142 representing the class Class 2.0, lines connecting the folder icons 143 and 144 representing the classes Class 2.1 and Class 2.2 to the folder icon 142 representing the class Class 2.0, and an arrow element 145 adjacent to the folder icon 142 representing that contents of the class Class 2.0. In other example, the document classification portion 131 may include other visual prompts to indicate a hierarchical arrangement of classes and sub-classes.

The file system like representation associated with the document classification portion 131 makes generation of a document classifier highly intuitive for users who regularly work with computers, but who may not regularly perform data science activities, such as generating a document classifier. To illustrate, the GUI 130 may be configured to mimic file system operations to add classes, to delete classes, or to re-arrange relationships among classes. For example, a new class can be added to the new classifier 140 by adding (e.g., using a "new folder" menu option) a new folder corresponding to the new class to the document classification portion 131 of the GUI 130. Similarly, a class can be deleted from the new classifier 140 by deleting (e.g., using a "delete folder" menu option) a folder icon corresponding to the class from the GUI 130. Classes can be re-arranged in the hierarchy by using drag-and-drop, move, cut-paste, or copy-paste operations to rearrange folders icons in the GUI 130. Thus, users who are able to navigate a relatively simple file system interface are able to define classes for the new classifier 140.

The GUI 130 also mimics file system operations to manage assignment of documents to particular classes. For example, a user (or multiple users) can assign a document to a class using operations that mimic drag-and-drop, move, cut-paste, or copy-paste operations. To illustrate, in FIG. 1, the file system navigator portion 132 of the GUI 130 displays the document icons 136, 137, 138 representing document Doc 1, Doc 2, and Doc 3, respectively. To assign a document to a particular class, a user may use a pointer 146 to select the document icon representing the document and drag the document icon to a folder representing a particular class. For example, in FIG. 1, the pointer 146 is illustrated selecting the document icon 137 representing the document Doc 2 and dragging the document icon 137 to the folder icon 144 associated with the class Class 2.2. The drag-and-drop operation in this example causes data to be stored indicating that the document Doc 2 is assigned to the class Class 2.2. If a document is associated with two or more classes, the document icon representing the document can be placed in two or more folder icons corresponding to the classes.

User input received via the GUI 130 and indicating assignment of a document to a class is used by the computing device 102 to generate classification data 117. For example, the user input is communicated, as input data 150, to the processor 103. The processor 103, executing the classifier generation instructions 106, stores information describing the document-class assignments in the classification data 117. In a particular aspect, the classifier generation instructions 106 are configured such that input received via the GUI 130 is not used to change the file tables 108. For example, assigning the document Doc 2 to the class Class 2.2 by dragging the document icon 137 to the folder icon 144 does not affect a logical or physical storage location associated with the document Doc 2 in the file system. Rather, in response to dragging the document icon 137 to the folder icon 144, the classifier generation instructions 106 generate an entry in the classification data 117. The entry includes a pointer to a storage location of the document Doc 2 and a tag (or label) indicating that the document Doc 2 is assigned to the class Class 2.2.

Entries in the classification data 117 may also include information indicating whether the entries were generated based on manual or automatic classifications. For example, a first entry 118 of the classification data 117 of FIG. 1 includes a pointer-tag combination and an M indicating that the first entry 118 is based on a manual document classification, such as by a user dragging the document icon 137 to the folder icon 144. Other entries of the classification data 117 may indicate that they were created based on automatic classifications. For example, a second entry 119 of the classification data 117 of FIG. 1 includes a pointer-tag combination and a "v.1" indicating that the second entry 119 is based on an automatic classification from a first version (version "v.1") of a document classifier. Similarly, a third entry 120 of the classification data 117 of FIG. 1 includes a pointer-tag combination and a "v.2" indicating that the third entry 120 is based on an automatic classification from a second version (version "v.2") of the document classifier.

Defining the classes and assigning documents to classes may be performed concurrently or sequentially. For example, a user may define a set of classes into which a corpus of documents is to be assigned. Subsequently, the same user or another user (or set of users) may assign documents from the corpus of documents to the classes (e.g., by moving representations of the documents to folders representing the classes). Alternatively, a new class can be defined after some documents have been assigned to previously defined classes. For example, a user that is manually classifying documents may, upon reviewing a particular document, determine that the particular document belongs to a class that is not represented in the previously defined classes. In this example, the user may generate a new class (using a "new folder" type operation) and assign the particular document to the new class (e.g., using a drag-and-drop operation). By representing the classes and documents in the file system-like GUI 130, the system 100 simplifies user interactions so that extensive model building training or data scientists are not needed to build the classification data 117.

In FIG. 1, the classifier generation instructions 106 include feature extraction instructions 113 and machine learning instructions 121. The feature extraction instructions 113 are executable by the processor 103 to generate document features based on the documents, and the machine learning instructions 121 are executable by the processor 103 to automatically generate a document classifier (or a set of document classifiers) based on the supervised training data. In a particular implementation, the machine learning instructions 121 include clustering instructions 152 that are executable to assist the user with generating the classification data 117, as explained further below.

In the example of FIG. 1, the feature extraction instructions 113 include word list instructions 114, word vector ("wordvec") instructions 115, and document vector ("docvec") instructions 116. The word list instructions 114 are executable by the processor 103 to generate a word list for each document of a set of documents. For example, the word list instructions 114 may generate a word list for each document associated with a manual classification in the classification data 117. In another example, the word list instructions 114 may generate a word list for each document in a corpus of documents including documents that are not associated with a classification. To illustrate, the files 109 may correspond to or include the corpus of documents, and users may manually classify only a subset of the documents in the files 109. In this illustrative example, the word list instructions 114 may generate word lists for all of the documents in the files 109. Additionally, in some implementations, the word list instructions 114 may determine statistical information representing occurrences of the words in the corpus of documents. For example, the word list instructions 114 may determine a count of occurrence of each word in the corpus of documents, a frequency of occurrence of each word in the corpus of documents, or an inverse frequency of occurrence of each word in the corpus of documents (e.g., an inverse document frequency (IDF)).

The wordvec instructions 115 are configured to access or generate wordvecs for words in the corpus of documents. A word vector refers to a vector or other data structure that represents syntactic and semantic relationships among words in an analyzed set of documents. The analyzed set of documents may include or correspond to the documents in the files 109, or the analyzed set of documents may be independent of and distinct from the files 109. Stated another way, the wordvecs may be generated based on the corpus of documents of the files 109, or may be generated independently of the corpus of documents of the files 109. For example, when the files 109 include documents in English, the wordvecs may be generated based on analysis of a distinct data set of English language documents. In this example, the wordvecs represent syntactic and semantic relationships among English language words in general, and not of the documents in files 109 in particular. Alternatively, the wordvecs may be determined based on the documents in the files 109, or based in part on the documents in the files 109. In a particular implementation, the wordvecs are generated via analysis of the documents in the files 109 using a continuous bag of words (CBOW) process or a skip-gram process.

The docvec instructions 116 are configured to generate docvecs for documents in the corpus of documents. A docvec is a vector or other data structure that represents a set of wordvecs for words in a particular document. The docvec of a document may be determined by identifying words in the document (e.g., based on a word list generated by the word list instructions 114), determining wordvecs for the words in the document, and mathematically combining wordvecs for the words in the document to generate a docvec of the document. Thus, the docvec represents an aggregation of syntactic and semantic relationships among the words in a particular document.

In a particular implementation, the docvec for a particular document is generated by aggregating the wordvecs for the particular document using a field by field mathematical operation. For example, each wordvec includes a plurality of fields (e.g., values or data elements), and the docvec of the particular document may represent a field-by-field sum or average of the wordvecs of the words in the particular document. As another example, the docvec of the particular document may represent a field-by-field weighted sum or weighted average of the wordvecs of the words in the particular document. In this example, a weighting value applied to a wordvec for a particular word is determined based on a frequency of occurrence (or another indication of specificity) of the particular word in the corpus of documents being classified. To illustrate, the frequency of occurrence or specificity of words may be determined as an inverse document frequency (IDF) value for each word in the document corpus. In this example, the docvec for a particular document may be calculated as a sum or average of the wordvecs for the particular document, where each wordvec is weighted by the corresponding IDF value.

After a user has generated one or more classes and assigned one or more documents to the user-defined classes (e.g., using the GUI 130), the clustering instructions 152 may be executed to suggest other documents to the user for classification, to suggest changes to the user-defined classes (e.g., addition of a new class), or a combination thereof. The operations performed by the clustering instructions 152 include semi-supervised machine learning. For example, as described further below, the clustering instructions 152 perform unsupervised document clustering while taking into consideration user-defined classes and document classifications.

The clustering instructions 152, when executed, use docvecs of documents of a document corpus to map the documents into a feature vector space. The feature vector space includes a plurality of dimensions, with each dimension corresponding to a docvec field. To illustrate, as explained above, each wordvec includes a plurality of fields, and each field is assigned a value (e.g., a floating point value). The values may be thought of as representing locations (e.g., coordinates) in a feature vector space that has a number of orthogonal axes corresponding to the number of fields in the wordvec. The number of fields in the wordvec (and the resulting number of orthogonal axes in the feature vector space) may be specified by the user (e.g., in the classifier generation settings) or may be a default value. The docvec of a particular document is a field-by-field mathematical aggregation of wordvecs of words that appear in the particular document. Thus, each docvec may have the same number of fields as the wordvecs used to generate the docvec.

The clustering instructions 152 are executable to evaluate groupings of documents in the features vector space based on values of the fields of the docvecs. As explained above, a docvec representing a particular document can be mapped to a location in the feature vector space. The location of the docvec in the feature vector space is generally indicative of the semantic content of the particular document represented by the docvec. The clustering instructions 152 are configured to group documents into clusters based generally on the notion that a distance between two documents in the feature vector space is generally indicative of semantic similarity (or dissimilarity) of the two documents. The clustering instructions 152 may use any of a number of different clustering operations. For example, the clustering instructions 152 may use connectivity clustering operations, centroid clustering operations, density clustering operations, or distribution clustering operations.

To begin the clustering operations, the clustering instructions 152 select a set of initial locations in the feature vector space. Each initial location represents a location, in the feature vector space, of a document of the document corpus. In implementations in which the clustering instructions 152 use connectivity clustering operations, centroid clustering operations, or density clustering operation, the initial locations are starting points for grouping documents to form the clusters. In such implementations, the clustering instructions 152 assign a document of the document corpus to a cluster based on a distance between a docvec of the document and each of the initial locations. For example, the clustering instructions 152 determine, for each initial location, a distance between a particular docvec and the initial location. The distance between two documents or a distance between a document and a cluster center may be determined as a Euclidean distance, a cosine distance (or cosine similarity), or a mutual information distance. The document represented by the particular docvec is assigned to a cluster with an initial location closest (among the set of initial locations) to the particular docvec. As documents are added to clusters, the operations associated with connectivity clustering, centroid clustering, and density clustering differ.

As a particular example, centroid clustering may use a k-means-like process. For example, as described further below, the initial locations may be used as cluster centers and each document of the document corpus may be assigned to a cluster associated with a cluster center that is closest to the document. In a particular implementation, unlike the k-means process, only some of the cluster centers are updated based on documents being assigned to the correspond cluster, as explained further below. When the clustering instructions 152 use distribution clustering operations, the initial locations correspond to an observed data set, which may be used to make an initial estimate of a distribution model (or distribution models) descriptive of the document corpus.

In some implementations of centroid clustering operations, the clustering instructions 152 select fixed cluster centers and variable cluster centers. A fixed cluster center corresponds to a location in the feature vector space of a document that has been assigned to a class (i.e., a labeled document). The clustering instructions 152 do not update fixed cluster centers based on documents being assigned to clusters. For example, during initiation of clustering operations, the clustering instructions 152 may select a particular document that has been classified by the user to represent a user-defined class, and the location of the particular document in the feature vector space may be designated as a fixed cluster center of a cluster. During the clustering operations, one or more other documents (including labeled documents, unlabeled documents, or both) may be assigned to the cluster because the fixed cluster center is closer to each of the one or more other documents than is each other cluster center evaluated by the clustering instructions 152. Thus, after the clustering operation, the cluster may include a plurality of documents, and the cluster may be represented by the fixed cluster center designated during initiation of the clustering operation. Since dimensions of the cluster in the feature vector space change with addition of each document to the cluster, after the clustering operation, the fixed cluster center will generally not be central to or a centroid of the cluster in the feature vector space. Nevertheless, the fixed cluster center will generally correspond to a location in the feature vector space of a document that is most semantically similar to the center to the cluster.

When centroid clustering operations are used, locations of variable cluster centers are updated as the clusters are formed by the clustering instructions 152. Initially, each variable cluster center corresponds to a location in the feature vector space of a document that has not been assigned to a class (i.e., an unlabeled document). For example, during initiation of the clustering operations, the clustering instructions 152 may select a particular unlabeled document to represent a cluster, and the location of the particular document in the feature vector space may be designated as an initial location of a variable cluster center of the cluster. During the clustering operations, a document may be assigned to the cluster because the variable cluster center is closer to the document than is each other cluster center evaluated by the clustering instructions 152. After the document is assigned to the cluster, a location of the variable cluster center is updated. For example, a center or centroid of the cluster may be determined based on a location in the feature vector space of each document assigned to the cluster. Thus, the location of each variable cluster center is updated occasionally, such as each time a document is added to the cluster. Accordingly, after performing the centroid clustering operations, the location of the variable cluster center will probably not correspond to a location of any document of the document corpus. Rather, the location of the variable cluster center represents the actual center or centroid of the cluster in the feature vector space.

In a particular implementation, the clustering instructions 152 select one fixed cluster center for each user defined class to which at least one document has been assigned. For example, when a class is associated with only one document, the location of that one document may be used as a fixed cluster center of the class. As another example, when the class is associated with more than one document, a single document associated with class may be selected, and the location in the feature vector space of the selected document may be used as the fixed cluster center of the class. In this example, the single document associated with the class may be selected randomly or pseudo-randomly from among the documents associated with the class. Alternatively, the clustering instructions 152 may determine a center or centroid (in the feature vector space) of the documents assigned to the class and the selected document may correspond to the document that is nearest the center or centroid.

In some implementations, the number of variable cluster centers used by the clustering instructions 152 is based on user input. For example, the user may be prompted to provide input indicating how many more documents the user is willing to classify. The input may identify a specific number of documents, or may specify information that may be used to infer the number of documents, such as a time limit. In this example, the number of variable cluster centers used may corresponded to the number of additional documents that the user is willing to classify. In another example, the clustering instructions 152 may be configured to perform clustering operations multiple times using a different number of variable cluster centers each time.

As explained above, initially, each variable cluster center corresponds to a location in the feature vector space of an unlabeled document. The document corpus may include a large number of unlabeled documents. In some implementations, unlabeled documents used to initiate variable cluster centers are selected randomly or pseudo-randomly from among the set of unlabeled documents. In other implementations, a more structured approach is used to distribute the locations of the variable cluster centers or all cluster centers within the feature vector space. To illustrate, in a first example, a first unlabeled document used to initiate a first variable cluster center is selected randomly or pseudo-randomly from among the unlabeled documents, and subsequently, a second unlabeled document used to initiate a second variable cluster center is selected randomly or pseudo-randomly from among unlabeled documents that are at least a threshold distance from the first variable cluster center. In the first example, locations of other variable cluster centers are selected in a similar manner from among unlabeled documents that are at least the threshold distance from each previously selected variable cluster center. In a second example, a first unlabeled document used to initiate a first variable cluster center is selected randomly or pseudo-randomly from among the unlabeled documents that are at least a threshold distance from each fixed variable cluster center, and subsequently, locations of other variable cluster centers are selected from among unlabeled documents that are at least the threshold distance from each previously selected variable cluster center and from each fixed cluster center. In a third example, both distance to a nearest cluster center and density of nearby documents is used to select the variable cluster centers. In this example, the clustering instructions 152 identify distributions of documents in the feature vector space and select variable cluster centers from regions with high concentrations (relative to other regions in the feature vector space) of unlabeled documents.

In implementations in which the clustering instructions 152 use connectivity clustering operations, clusters are generated in a manner similar to the manner described above for centroid clustering except that a document is added to a cluster based on a distance between the document and one or more other documents of the cluster (rather than based on a distance between the document and a center of the cluster). For example, initially, each initial location is the only document of a cluster. The clustering instructions 152 determine distances between a particular initial location and a set of documents of the document corpus. A first document is added to the cluster associated with the particular initial location based on the first document being the closest document of the document corpus to the particular initial location. Subsequently, the clustering instructions 152 add other documents to the cluster based on the other documents being closest to any document of the cluster (e.g., the first document, the particular initial location, or another document of the cluster). Thus, the connectivity clustering operations generate a cluster by adding documents to the cluster that correspond to the shortest connections to documents of the cluster.

In implementations in which the clustering instructions 152 use density clustering operations, clusters are generated in a manner similar to the manner described above for connectivity clustering except that density of nearby documents is also considered when determining whether to add a document to a cluster. For example, the density clustering operations may evaluate a density threshold as well as a distance between documents when determining whether to add a document to a document cluster. Thus, the density clustering operations generate a cluster by adding documents to the cluster that correspond to the shortest connections to documents of the cluster and that satisfy the density threshold. The density threshold may specify, for example, a minimum number of documents within a threshold distance.

After performing clustering operations, the classifier generation instructions 106 may identify, based on the clusters, one or more recommended actions to improve operation of the document classifier that is to be generated. To illustrate, the classifier generation instructions 106 may prompt the user to classify one or more additional documents that are selected, based on the clusters, to improve operation of the document classifier that is to be generated. Since the clusters are generated based on distances between documents, a particular document selected for classification (e.g., an unlabeled document) by the user is selected based on a distance between the particular document and one or more other documents (e.g., a labeled document) or a cluster of documents.

For example, a labeled document may be associated with a first cluster and the particular document may be associated with a second cluster. In this example, the particular document may be selected for classification by the user based on a determination that a quantity of labeled documents in the second cluster fails to satisfy a threshold. The quantity may be measured as a count (e.g., a count of labeled documents in the second cluster) or as a density (e.g., a density of labeled documents in the second cluster). To illustrate, when the quantity is measured as a count, the threshold may have a value of one; thus, the particular document may be selected based on the second cluster having fewer than one labeled document.

As another example, the particular document and the labeled document may both be associated with the first cluster. In this example, the particular document may be selected for classification by the user based on a determination that a number of hops (e.g., links between documents based on connectivity clustering or density clustering) satisfies a threshold. In this example, the number of hops indicates a distance between documents within the same cluster. As the number of hops increases, the semantic similarity between the documents decreases.

As yet another example, the clustering operations may identify a region with a high concentration (relative to other regions of the feature vector space) of unlabeled documents. In this example, the user may be prompted to classify a document that is near the center of the region to ensure that the supervised training data used to train the document classifier includes sufficient information to enable the document classifier to reliably assign classes to documents within the region. Alternatively, or in addition, the user may be prompted to indicate whether the region corresponds to a class of documents that the user has not yet specified. That is, the high concentration of unlabeled documents may be indicative of a cluster of related documents that the user has not yet defined. Thus, the clustering operation can facilitate identifying new classes that the user has not yet specified. As another example, the user may be prompted to classify a document that is in a boundary region between two clusters to ensure that the supervised training data includes sufficient examples to assign documents near the boundary region to appropriate classes.

After the user has specified classes and assigned documents to the classes (e.g., independently, responsive to prompts generated based on the clustering, or both), docvecs of the documents that have been manually classified by a user are used with classification information for each document as supervised training data input to the machine learning instructions 121. For example, the supervised training data may include a docvec for each document and a tag (or label) indicating a class to which the document is assigned.

The machine learning instructions 121 are executable by the processor 103 to perform an automated model building process to generate a document classifier based on the supervised training data. In some implementations, the machine learning instructions 121 are configured to generate multiple document classifiers (e.g., multiple preliminary document classifiers 122) based on the supervised training data. In such implementations, the multiple preliminary document classifiers 122 may be of different types, such as a neural network-based document classifier, a decision tree-based document classifier, a support vector machine-based document classifier, a regression-based document classifier, a perceptron-based document classifier, a naive Bayes-based document classifier, a document classifier using another machine learning process, or a combination thereof. In a particular aspect, each preliminary document classifier of the multiple preliminary document classifiers 122 may be generated using respective classifier generation settings 123. For example, a first preliminary document classifier may be generated using particular classifier generation settings of the classifier generation settings 123, and a second preliminary document classifier may be generated using different classifier generation settings of the classifier generation settings 123. As described further below, the classifier generation settings 123 may indicate a type of document classifier (or types of document classifiers) to be generated and parameters associated with generating the document classifier. In this example, the supervised training data are provided to the machine learning instructions 121, and the machine learning instructions 121 generate multiple document classifiers.

Some types of document classifiers may perform better (e.g., provide more reliable document classification) than other types for a particular document corpus. For example, a support vector machine (SVM) classifier may perform better than a neural network classifier for a particular document corpus, whereas a neural network classifier may perform better than a SVM classifier for another document corpus. Typically, a data scientist uses expertise and training to determine which type of classifier model to use for a particular document corpus. However, to avoid the expense of relying on the expertise of a data scientist, particular implementations described herein generate a suite of preliminary document classifiers 122 for a document corpus being classified. The suite of preliminary document classifiers 122 includes multiple distinct types of document classifiers.

The performance of each preliminary document classifier is evaluated to identify a best performing preliminary document classifier of the suite of preliminary document classifiers 122. In a particular implementation, the best performing preliminary document classifier is selected for use (e.g., as an active document classifier 110). In another implementation, after the best performing preliminary document classifier is identified, the machine learning instructions 121 generate the active document classifier 110 based on classifier generation settings that were used to generate the best performing preliminary document classifier. In this implementation, the active document classifier 110 may be generated using all of the supervised training data, or a larger subset of the supervised training data than was used to generate the best performing preliminary document classifier.

For example, to generate the preliminary document classifiers 122, the machine learning instructions 121 may partition the supervised training data into a first portion (e.g., a training portion) and a second portion (e.g., a test portion). The training portion of the supervised training data may be used to generate the preliminary document classifiers 122, and the test portion may be used to evaluate performance of the preliminary document classifiers 122. In this example, the test portion may be provided as input to each of the preliminary document classifiers 122, and performance of each of the preliminary document classifiers 122 may be evaluated based on document classifications output by each preliminary document classifier. The preliminary document classifier that provides document classification that most closely matches the user specified classifications may be identified as the best performing preliminary document classifier. To illustrate, document classifications generated by a first preliminary document classifier may be compared to manual document classifications indicated in the supervised training data to generate a first performance metric associated with the first preliminary document classifier. Likewise, document classifications generated by a second preliminary document classifier may be compared to the manual document classifications indicated in the supervised training data to generate a second performance metric associated with the second preliminary document classifier. In this illustrative example, the first performance metric and the second performance metric may be compared to determine a best performing preliminary document classifier among the multiple preliminary document classifiers 122. In some implementations, other performance metrics may also be used to determine a best performing preliminary document classifier, such as complexity of each of the preliminary document classifiers 122, a processing time of each of the preliminary document classifiers 122, and so forth.

If none of the preliminary document classifiers 122 performs adequately (e.g., with accuracy greater than or equal to a threshold established by a performance criterion), the user may be prompted to increase the size of the supervised training data, e.g., by classifying more documents. In this example, if no preliminary document classifier satisfies the performance criterion, the machine learning instructions 121 may instruct the GUI generation instructions 112 to prompt the user to provide additional document classifications to improve the accuracy or other performance metrics of the preliminary document classifiers 122. Alternatively, the machine learning instructions 121 may restart the model building process using the supervised training data to generate a new suite of preliminary document classifiers, which may be tested for performance.

In a particular aspect, the machine learning instructions 121 generate the active document classifier 110 using classifier generation settings associated with the best performing preliminary document classifier. Further, in this particular aspect, rather than partitioning the supervised training data (e.g., into a training portion and a test portion), the machine learning instructions 121 may use the entire set of supervised training data (or a larger subset of the supervised training data) to generate the active document classifier 110. For example, the classifier generation settings 123 may cause the machine learning instructions 121 to use a training portion of the supervised training data to generate a SVM-based preliminary document classifier and a neural network-based preliminary document classifier. In this example, a test portion of the supervised training data is used to test performance of the SVM-based preliminary document classifier and the neural network-based preliminary document classifier. If the SVM-based preliminary document classifier outperforms the neural network-based preliminary document classifier, the machine learning instructions 121 use the entire set of supervised training data to generate the active document classifier 110 as a SVM-based document classifier using settings (from the classifier generation settings 123) that were used to generate the SVM-based preliminary document classifier. However, if the neural network-based preliminary document classifier outperforms the SVM-based preliminary document classifier, the machine learning instructions 121 use the entire set of supervised training data to generate the active document classifier 110 as a neural network-based document classifier using settings (from the classifier generation settings 123) that were used to generate the neural network-based preliminary document classifier.

The machine learning instructions 121 may be initiated responsive to user input or automatically in response to detecting that an initiation criterion has been satisfied. For example, an initial document classifier may be built based on determining that the supervised training data is sufficient (e.g., that at least one document has been assigned to each class). As another example, the active document classifier 110 may be updated (or a new document classifier may be generated) occasionally, in which case the initiation criterion is a rebuild criterion. The rebuild criterion may be satisfied when a time limit expires or when another condition indicates that performance of the active document classifier 110 becomes suspect. To illustrate, the rebuild criterion may be satisfied when a distribution of document classifications determined by the active document classifier 110 changes significantly (e.g., more than a threshold amount).

The active document classifier 110 may be used to classify new documents as well as documents of the document corpus that were not manually classified. For example, when a new document is added to the files 109, the active document classifier 110 may classify the new document and store data indicating the classification. In a particular implementation, the data indicating the classification may be stored as a pointer and a tag in the classification data 117 as described above. In this implementation, the classification data 117 are stored separately from the documents of the document corpus. Further, classification data generated by the active document classifier 110 and manual classifications generated by the user may be stored together (in a shared data structure) or separately. Whether the classification data generated by the active document classifier 110 and the manual classifications generated by the user are stored together or separately, the classification data generated by the active document classifier 110 and the manual classifications generated by the user may be distinguishable. For example, classification data generated by the active document classifier 110 may be flagged or tagged as automatically generated, and manual classifications generated by the user may be flagged or tagged as manually generated. To illustrate, an entry of the classification data 117 generated by the active document classifier 110 may be stored with data identifying a particular document classifier that generated the data (e.g., a version number or other identifier, such as the version number "v.1" of the second entry 119 of the classification data 117). As another illustrative example, an entry of the classification data 117 generated based on a manual classification by a user may be tagged or labeled with an identifier of the user (e.g., a user name or other identifier).

Storing data distinguishing automatically generated classifications from user generated classifications enables use of the user generated classifications as supervised training data during generation of a subsequent document classifier. For example, while a first active document classifier is in use, a user may notice that a particular document has been misclassified by the first active document classifier. The user may reclassify the particular document (e.g., by dragging an icon representing the document from a folder representing a first class to a folder representing a second class). Based on the user's reclassification of the particular document, data identifying the new classification of the particular document and data identifying the user may be stored in the classification data 117. Subsequently, the new classification of the particular document may be used as part of the supervised training data to generate a new document classifier based on the new classification being identified as user generated. Thus, user generated classifications indicated during a training session (e.g., when the user is classifying documents but not using or generating the document) can be used with classifications indicated while a user is using or generating the document to generate a new or updated document classifier.

In a particular implementation, the classifier generation instructions 106 may store data indicating automatic document classifications over time. For example, a count may be incremented (or a corresponding data entry updated) when the active document classifier 110 assigns a document to a particular class. Over time, document classification trends associated with the active document classifier 110 may become apparent and may be used as an indicator of when the reliability of the active document classifier 110 is suspect. For example, during a first period of time, documents classified by the active document classifier 110 may have a first distribution among the classes. Subsequently, during a second period of time, documents classified by the active document classifier 110 may have a second distribution among the classes, where the second distribution differs significantly (e.g., more than a threshold difference) from the first distribution. Such a change in the distribution of documents among various classes may indicate that the document corpus has changed (e.g., through addition of new documents) enough that a new document classifier should be generated. Generation of the new (or updated) document classifier may be performed automatically based on determining that the reliability of the active document classifier 110 is suspect, or a user or system administrator may be prompted to initiate generation of the new (or updated) document classifier based on determining that the reliability of the active document classifier 110 is suspect. Generation of a new (or updated) document classifier proceeds as described above with all user generated classifications and reclassification being used as supervised training data.

Generation of a new (or updated) document classifier may also, or in the alternative, be performed based on user reclassification of documents that the active document classifier 110 classified. For example, a count or other indication of user reclassification of documents may be maintained. When the count exceeds a threshold (or when a rate of reclassifications exceeds a threshold rate), generation of a new (or updated) document classifier may be performed with all user generated classifications and reclassification being used as supervised training data. Further, a new (or updated) document classifier may be generated based on a user modifying the classes. For example, after a period of using the active document classifier 110, a user may recognize that two distinct types of documents are being grouped together in a single class. Accordingly, the user may generate a new class (or two new classes) and assign documents to the new class or new classes using the file system-type operations described above. The original class that included the two distinct types of documents may be retained or deleted. As another example, after a period of using the active document classifier 110, a user may generate a new type of document and assign the new type of document to a new class, e.g., by using the file system-type operations described above. After the classes have been modified (e.g., by adding new classes, deleting old classes, rearranging the hierarchy of a classes, etc.), generation of a new (or updated) document classifier may be initiated. Thus, the file system-type operations describe above enable simplified, low-cost creation and maintenance of document classifiers.

In the example illustrated in FIG. 1, the memory 104 includes document management instructions 107. The document management instructions 107 may be executable by the processor 103 to perform operations that facilitate document management after a document classifier has been generated by the classifier generation instructions 106. For example, in FIG. 1, the document management instructions 107 include the active document classifier 110 and document access instructions 111. The active document classifier 110 may be configured to provide document classifications for documents that were not manually classified. For example, when a new document is generated or imported into the files 109, the active document classifier 110 may assign the document to one or more of the classes.

The document access instructions 111 are executable by the processor 103 to enable class-based access to the documents. For example, the document access instructions 111 may include a file browser application that enables users to view the classes via a GUI and to access documents via the GUI. In another example, the document access instructions 111 may include a plug-in or other supplemental instructions that enable a file system browser to display graphical representations of the classes and enable access to the documents via the classes. Since the document classifications are independent of storage locations within the file system, the document access instructions 111 may use the pointers and tags in entries of the classification data 117 to enable class-based access to the documents.

Although FIG. 1 illustrates a single computing device 102, in other implementations, the system 100 may include more than one computing device. For example, a first computing device (e.g., the computing device 102 of FIG. 1) may generate the active document classifier 110 and distribute copies of the active document classifier 110 to multiple other computing devices via a network. As another example, the classifier generation instructions 106 may be distributed among multiple computing devices such that the multiple computing devices cooperate to generate the active document classifier 110. To illustrate, a first preliminary document classifier of the preliminary document classifiers 122 may be generated by a first computing device, and a second preliminary document classifier of the preliminary document classifiers 122 may be generated by a second computing device. In this illustrative example, the first and second preliminary document classifiers may be sent to one or more other computing devices for performance testing, or the computing device that generated a particular preliminary document classifier may test the particular preliminary document classifier and report performance test results to another computing device for selection of the best performing document classifier. Further, the document access instructions 111 may be distributed among multiple computing devices to enable users of the multiple computing devices to browse files or documents based on the classification data 117. Moreover, the files 109 may be stored at many different computing devices that are connected via a network. Thus, the system 100 may be operable as an enterprise-based or internet-based document analysis and classification system that generates and manages document classifiers without oversight by a data scientist.

FIGS. 2-7 illustrate examples of the graphical user interface 130. In the examples illustrated in FIGS. 2-7, the GUI 130 includes selectable options to perform the file system-type operations described with reference to FIG. 1. For example, the GUI 130 includes selectable options to manage classes, selectable options to access particular portions of the files system, and selectable options to initiate or manage generation of document classifiers. For ease of illustration and to mimic familiar user interfaces, these selectable options may be functionally grouped using tabs. Thus, in FIGS. 2-7, the GUI 130 includes a classifier tab 201, a file system tab 202, a builder tab 203, and a recommendations tab 204. In other examples, the selectable options may be organized in a different manner (with or without tabs). For example, icons representing various selectable options may be arranged in a "ribbon" or tool bar in the GUI 130. As another example, the selectable options may be accessible via context menus, as described further below.

Figure 2:
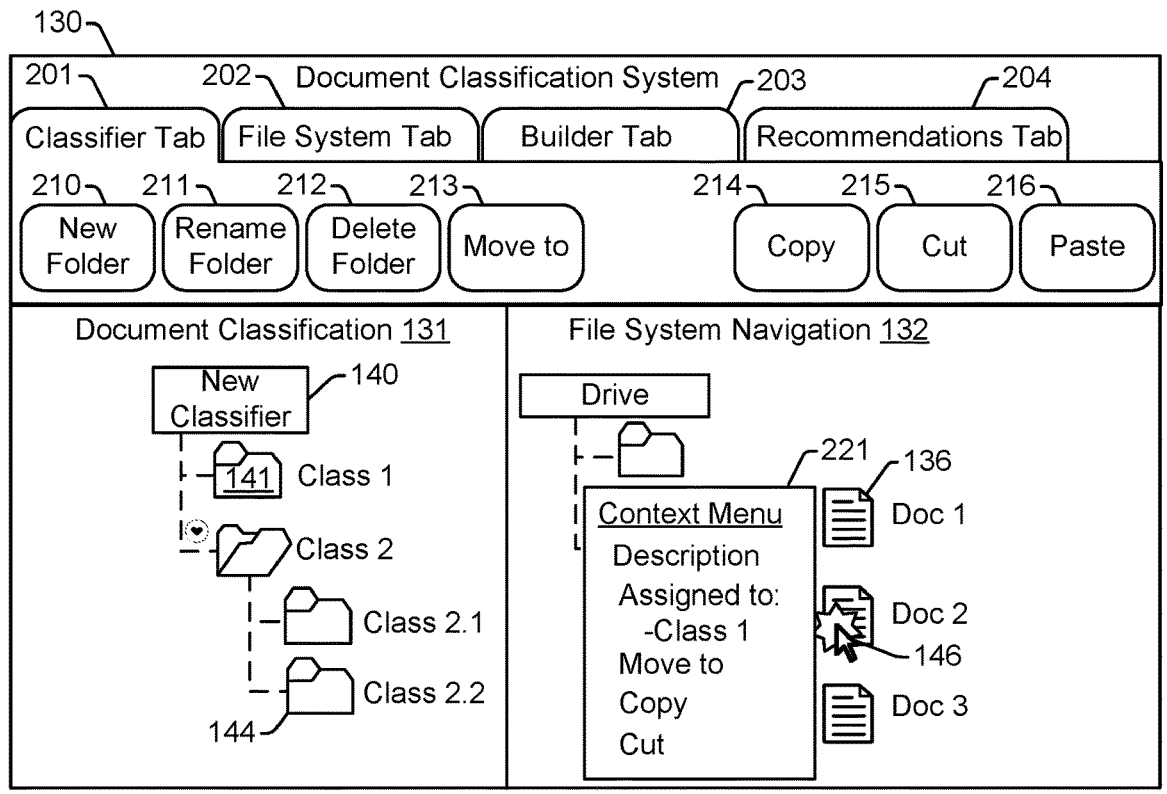
FIG. 2 illustrates a first particular example of a graphical user interface to simplify document classifier generation.

FIG. 2 represents the GUI 130 with the classifier tab 201 selected. The classifier tab 201 may include selectable options associated with defining classes and assigning documents to classes. For example, in FIG. 2, the classifier tab 201 includes a tool bar that includes selectable options 210-216. The selectable options 210-216 include a new folder selectable option 210 to generate a new folder in the document classification portion 131 of the GUI 130. The new folder generated by selection of the new folder selectable option 210 represents a new class; thus, selecting the new folder selectable option 210 causes a new class to be generated and a graphical representation of the new class (in the form of a folder icon) to be displayed in the GUI 130.

The selectable options 210-216 also include a rename folder selectable option 211 to rename a folder in the document classification portion 131 of the GUI 130. Selecting a folder in the document classification portion 131 of the GUI 130 and selecting the rename folder selectable option 211 enables the user to assign a new name to a class (represented by the selected folder).

The selectable options 210-216 also include a delete folder selectable option 212 to delete a folder in the document classification portion 131 of the GUI 130. Selecting a folder in the document classification portion 131 of the GUI 130 and selecting the delete folder selectable option 212 causes a class represented by the selected folder to be deleted.

The selectable options 210-216 also include a move to selectable option 213. Selection of the move to selectable option 213 enables a user to move a document or folder in the GUI 130. Functionality of the move to selectable option 213 may depend on whether a folder is selected in the document classification portion 131 of the GUI 130 or a document is selected in the file system navigator portion 132 of the GUI. For example, when a user selects a folder in the document classification portion 131 of the GUI 130 and selects the move to selectable option 213, the selected folder may be moved within a hierarchy of the new classifier 140. To illustrate, after the user selects the folder icon 144 and selects the move to selectable option 213, the user may move the folder icon 144 into the folder icon 141. In this illustrative example, moving the folder icon 144 into the folder icon 141 causes the class Class 2.2 to be a sub-class of the class Class 1 rather than a sub-class of the class Class 2. If the user selects a document in the file system navigation portion 132 of the GUI 130 and selects the move to selectable option 213, the selected document may be moved to a folder of the new classifier 140. To illustrate, if the user selects the document icon 136 and selects the move to selectable option 213, the user may move the document icon 136 into the folder icon 144. In this illustrative example, moving the document icon 136 into the folder icon 144 causes the document Doc 1 to be assigned to the class Class 2.2.

The selectable options 210-216 also include a copy selectable option 214, a cut selectable option 215, and a paste selectable option 216. The copy selectable option 214, the cut selectable option 215, and the paste selectable option 216 perform copy, cut, and paste operations, respectively, on selected icons of the GUI 130. As explained above, the icons represent documents and classes. Accordingly, copying, cutting, or pasting operations performed on folder icons change classes of the new classifier 140. For example, copying and pasting the folder icon 144 into the folder icon 141 causes a new sub-class, with the name class Class 2.2, to be added as a sub-class of the class Class 1 while retaining the class Class 2.2 as a sub-class of the class Class 2. Copying, cutting, or pasting operations performed on a document icon changes assignment of the document represented by the document icon to one or more classes of the new classifier 140. For example, copying and pasting the document icon 136 into the folder icon 144 causes the document Doc 1 to be assigned to the class Class 2.2.

Various operations may also, or in the alternative, be performed using context menu selections. For example, a context menu 221 may be displayed in response to a user using the pointer 146 to select (e.g., to "right click") the document icon 136. In this example, the context menu 221 includes selectable options similar to one or more of the selectable options 210-216. The context menu 221 may also include other selectable options or information. For example, in FIG. 2, the context menu 221 includes a description of the document Doc 1. The description may include metadata, such as a timestamp, a file name, a file name extension, information regarding who generated the document, etc. If the selected document has been assigned to a class, the context menu 221 may indicate which class or classes the document has been assigned to, information indicating how the assignment was generated (e.g., manually or automatically), etc.

Figure 3:
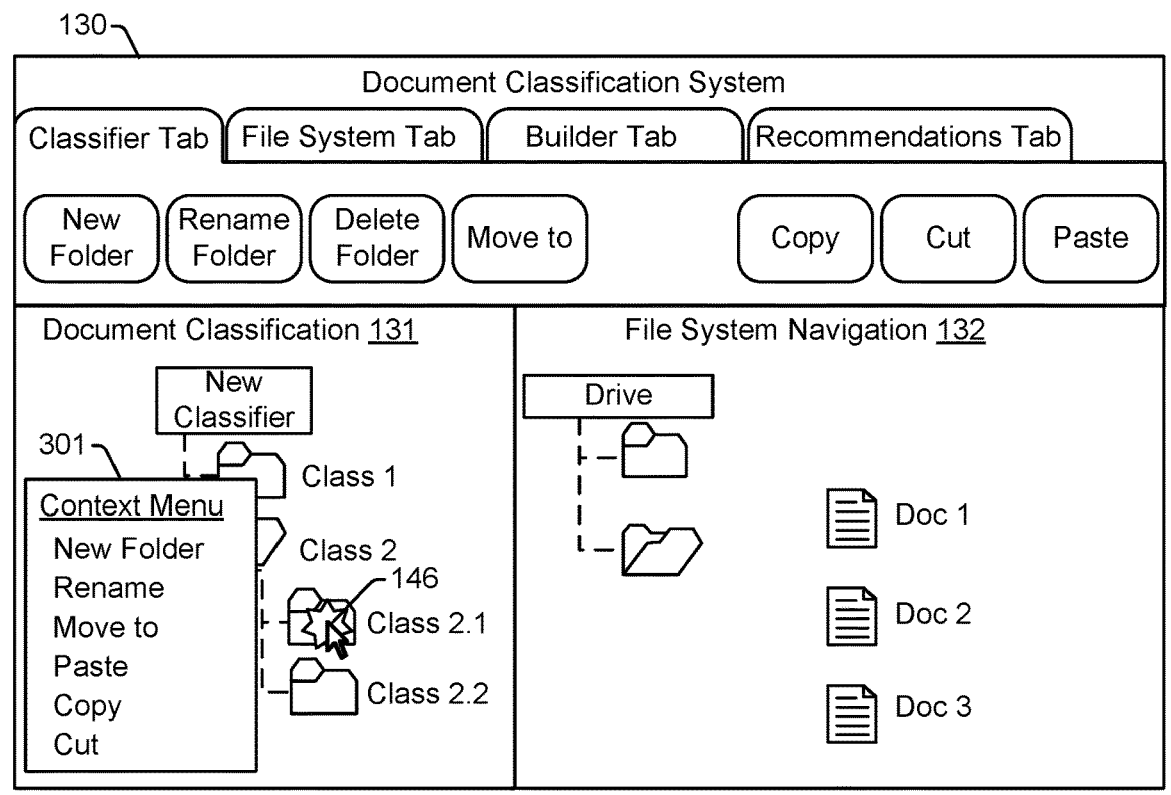
FIG. 3 illustrates a second particular example of a graphical user interface to simplify document classifier generation.

FIG. 3 illustrates an example of a context menu 301 displayed responsive to selection (e.g., a right-click) of a folder icon. In this example, the context menu 301 includes selectable options similar to one or more of the selectable options 210-216. The context menu 301 may also include other selectable options or information, such as a description of the class Class 2.1 associated with the selected folder icon.

Figure 4:
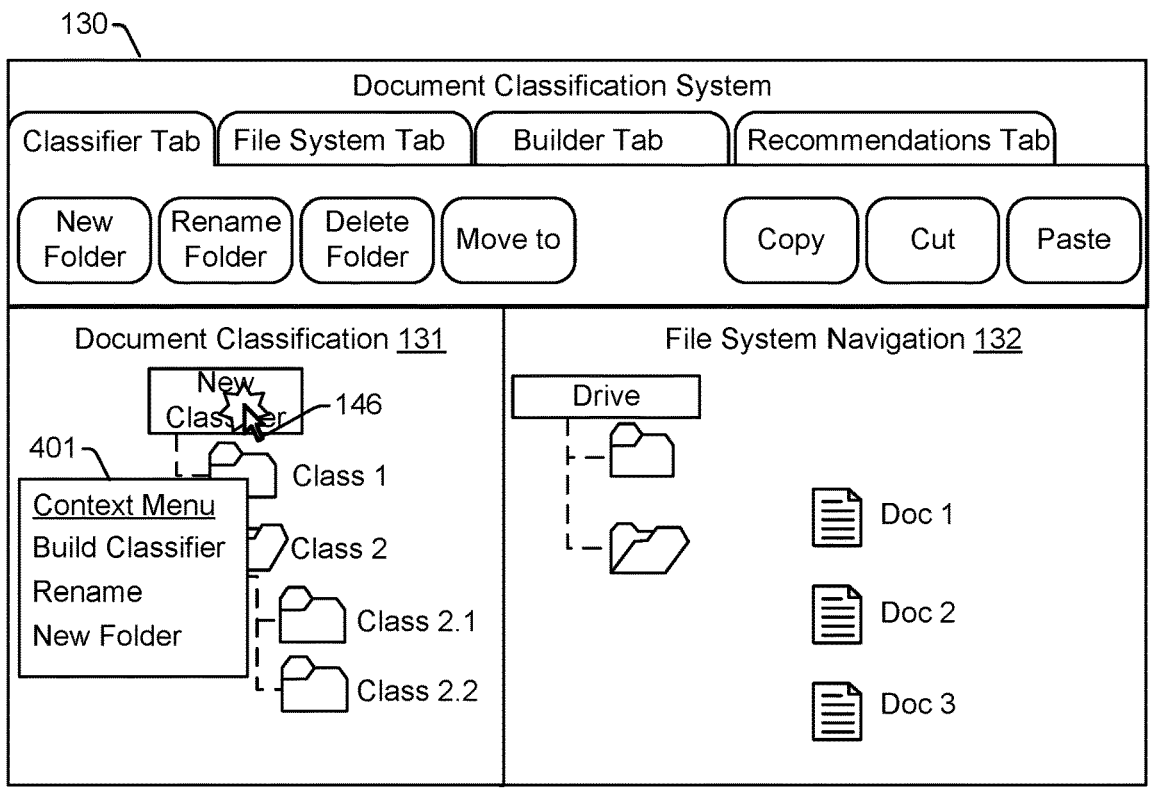
FIG. 4 illustrates a third particular example of a graphical user interface to simplify document classifier generation.

FIG. 4 illustrates an example of a context menu 401 displayed responsive to selection (e.g., a right-click) of a root folder icon representing the new classifier 140. In this example, the context menu 401 includes selectable options similar to one or more of the selectable options 210-216. The context menu 401 may also include a selectable option (e.g., a "build classifier" option) to initiate generations of a document classifier. In other examples, the context menu 401 may also include other selectable options or information, such as a description of the new classifier 140, a number of documents associated with classes of the new classifier 140, or an indication of how many more documents should be classified manually before a document classifier is generated.

Figure 5:
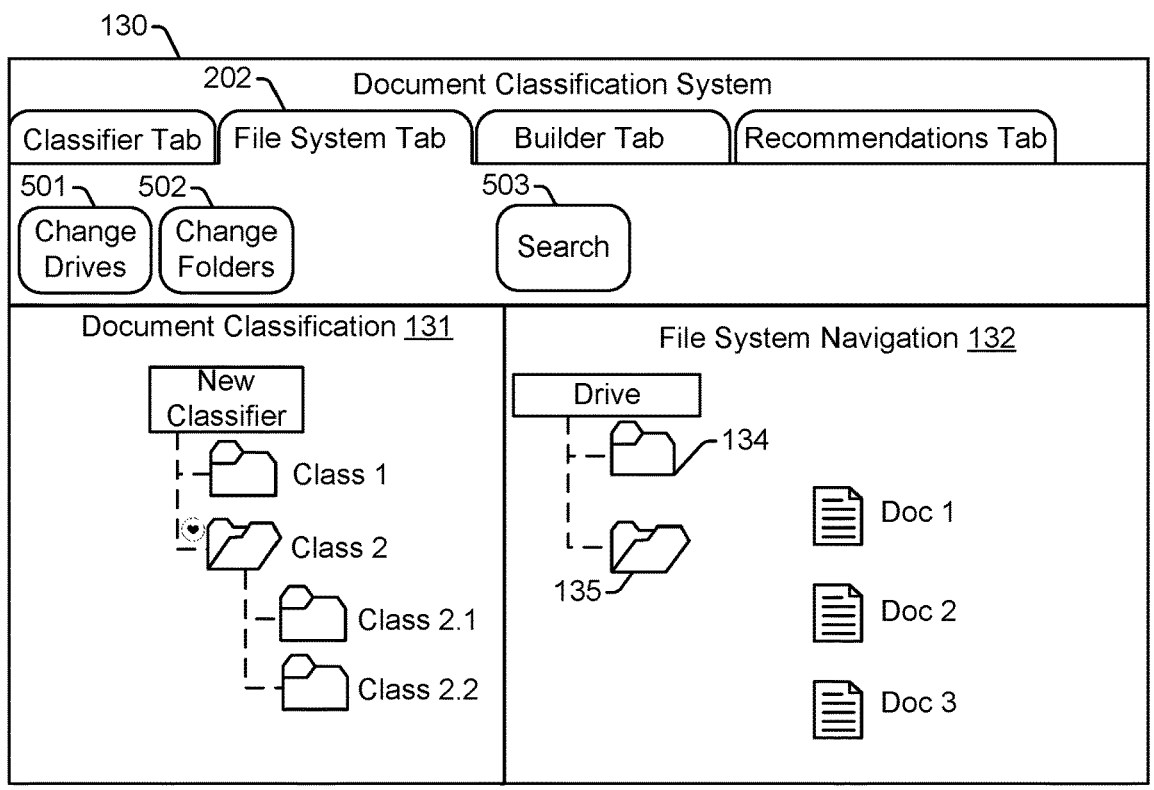
FIG. 5 illustrates a fourth particular example of a graphical user interface to simplify document classifier generation.

FIG. 5 represents the GUI 130 with the file system tab 202 selected. The file system tab 202 includes selectable options associated with navigating the file system. For example, in FIG. 5, the file system tab 202 includes a tool bar that includes selectable options 501-503. The tool bar includes a change drives selectable option 501 to enable selection of a different drive, a different logical partition, a different physical storage location, or a different root folder. The tool bar may also include a change folders selectable option 502 to enable opening a different folder. For example, in FIG. 5, the folder icon 135 is open indicating that the documents Doc 1, Doc 2, and Doc 3 are stored in a location associated with the folder icon 135. The change folders selectable option 502 may be selected to close the folder icon 135 and open the folder icon 134, resulting in display of document icons representing documents stored in a location associated with the folder icon 134. The tool bar also includes a search selectable option 503. The search selectable option 503 enables a user to search for a particular drive, folder, or document within the file system.

Figure 6:
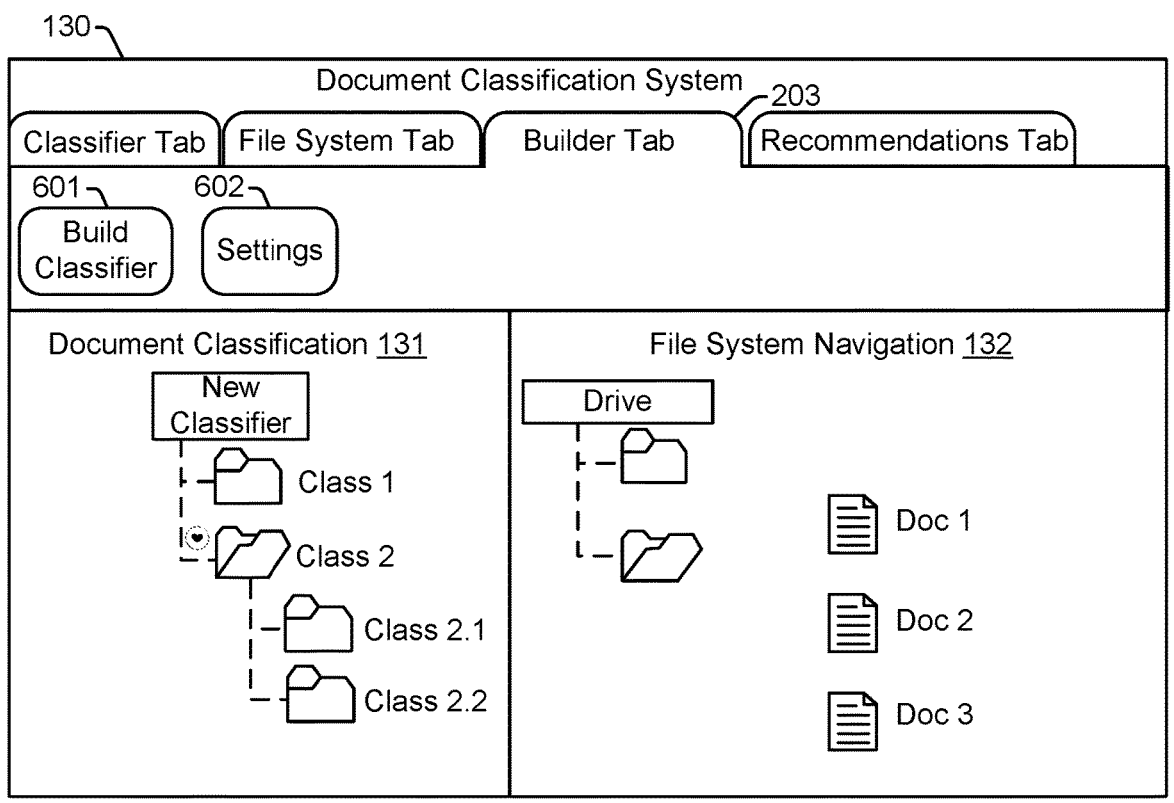
FIG. 6 illustrates a fifth particular example of a graphical user interface to simplify document classifier generation.

FIG. 6 represents the GUI 130 with the builder tab 203 selected. The builder tab 203 includes selectable options associated with generating a document classifier. For example, in FIG. 6, the builder tab 203 includes a tool bar that includes a build classifier selectable option 601 and a settings selectable option 602. The build classifier selectable option 601 is selectable to initiate generation of a document classifier. The settings selectable option 602 is selectable to enable the user to specify the classifier generation settings 123. For example, selecting the settings selectable option 602 may cause a menu (not shown) to be displayed. The menu may include options to specify setting associated with whether the preliminary document classifiers 122 should include particular types of document classifiers, and settings associated with each particular type of document classifier. For example, for decision tree-based document classifiers, the settings may enable specifying a splitting strategy (e.g., strategy to use to split at each node), a splitting criterion (e.g., a function to measure quality of a split), a threshold (e.g., maximum or minimum) number of features, a threshold (e.g., maximum or minimum) depth, a weighting criterion (e.g., a threshold number of samples to produce a split or a threshold number of samples to be a leaf node), class weights, and so forth. As another example, for SVM-based document classifiers, the settings may enable specifying a kernel function type (e.g., linear or non-linear), a number of classes, and so forth. As another example, for regression-based document classifiers, the settings may enable specifying a bias value or bias function, a number of classes, a class weight, a penalty, etc. As still another example, for perceptron-based document classifiers, the settings may enable specifying a regularization, an alpha value, a number of iterations, an eta value, a number of classes, class weights, etc. As a further example, for naive Bayesian-based document classifiers, the settings may enable specifying a number of classes, a smoothing parameter, a prior value or function (e.g., uniform priors), etc.

In some implementations, the settings may also enable a user to specify how and when a document classifier is generated. For example, the settings may include an option to specify a rebuild criterion indicating a condition or conditions for initiating generation of an updated document classifier, such as a time period following generation of the active document classifier 110, a threshold number of automatically classified documents that are reclassified by a user, a change in the classes (e.g., addition of classes or deletion of classes by a user), etc.

In yet another example, the settings may include an option to specify how the docvecs are formed. To illustrate, the option to specify how the docvecs are formed may allow the user to select use of docvecs based on a sum of wordvecs or based on a weighted sum of wordvecs. The setting may also include an option to specify how the wordvecs are generated. To illustrate, the user may specify a source of the wordvecs in the settings (e.g., a commercial or academic source of wordvecs), or the user may specify that the wordvecs are to be generated based on the files 109 using a skip-gram or CBOW process.

Figure 7:
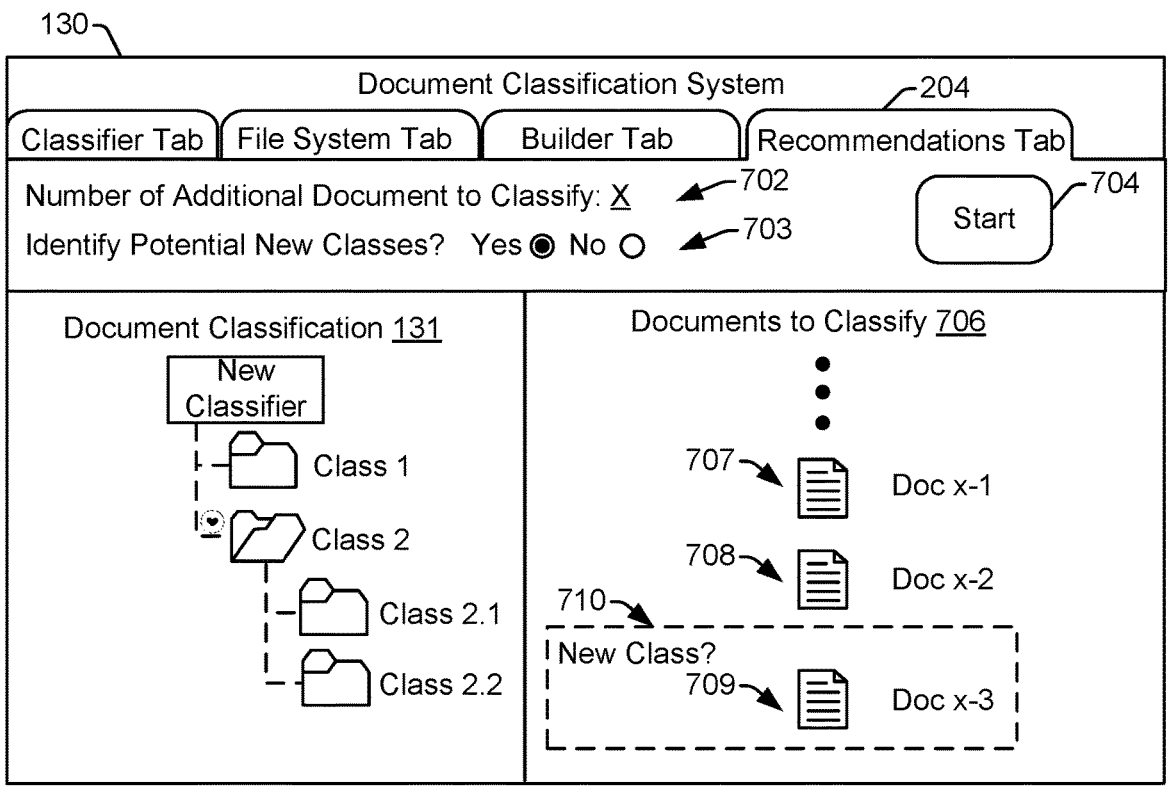
FIG. 7 illustrates a sixth particular example of a graphical user interface to simplify document classifier generation.

FIG. 7 represents the GUI 130 with the recommendations tab 204 selected. In the example illustrated in FIG. 7, the recommendations tab 204 includes a prompt 702 to request that the user indicate a number of additional documents to be classified. The number of additional documents ("X" in FIG. 7) to be classified indicated by the user may be used as in input to the clustering instructions 152. For example, when the clustering instructions 152 use centroid clustering operations, the number of additional documents to classify may be used to determine a number of variable cluster centers used by the clustering instructions 152. For example, based on user input indicating that X (where X is a positive integer) additional documents are to be classified, the clustering instructions 152 may select X or fewer than X variable cluster centers to initiate the clustering operation.

The recommendations tab 204 may also include one or more other prompts to configure analysis of the clustering results. For example, in FIG. 7, the recommendations tab 204 includes a prompt 703 to indicate whether the classifier generation instructions 106 should attempt to detect clusters that may be indicative of new classes with the clustering results. In this example, if user input via the prompt 703 indicates that the classifier generation instructions 106 should attempt to detect clusters that may be indicative of new classes, the classifier generation instructions 106 may analyze the clusters to detect regions with large concentrations of unlabeled documents that are distant from a fixed cluster center.

The recommendations tab 204 may also include a start selectable option 704 to initiate generation of recommendations. In a particular implementation, the clustering instructions 152 are executed responsive to selection of the start selectable option 704.

After the clustering operations are performed, the recommendations tab 204 displays recommendations based on the results of the clustering operations. For example, in FIG. 7, the recommendations tab 204 includes a documents to classify portion 706 which lists documents 707, 708, 709 that are recommended for classification by the user. The set of documents recommended for classification by the user includes a number of documents that is less than or equal to the number of additional documents to classify indicated by the user in response to the prompt 702. Further, the documents 707, 708, 709 may be ordered based on a prediction of how much benefit will be derived from the user assigning a class to each document. For example, the document 707 may correspond to a document that is located in the feature vector space near a boundary of two clusters associated with user defined classes (i.e., clusters with fixed cluster centers). Accordingly, user classification of the document 707 may benefit the document classifier by improving accuracy of classification of documents that are near a boundary between the two clusters. However, the document 708 may be located in an area that is only associated with one cluster, and therefore no significant disambiguation accuracy may result from the user classifying the document 708. Thus, the document 707 may be listed before the document 708 in a priority order of a list of documents in the documents to be classified portion 706.

In some implementations, the documents to be classified portion 706 may also identify documents that may be associated with new classes. For example, in FIG. 7, the document 709 is associated with a prompt 710 suggesting that the document 709 may be associated with a class that the user has not yet specified.

The user may use file system-type operations, as described above, to provide additional classification information based on results presented via the recommendations tab 204 of the GUI 130. For example, the user may use a drag-and-drop operation to assign a document from the documents to be classified portion 706 to a class represented by a folder icon in the document classification portion 131. As another example, the user may add a folder to the document classification portion 131 to generate a new class. After assigning classes to one or more of the documents 707, 708, 709, generating one or more new classes, or both, the user can navigate to the builder tab 203 and select the build classifier selectable option 601 to initiate building the document classifier.

FIGS. 8, 9, 10 and 11 illustrate clustering of documents using centroid clustering operations based on fixed cluster centers and variable cluster centers. Each of FIGS. 8-11 shows a diagram 800 representing a simplified feature vector space. The diagram 800 shows two axes, e.g., a first axis 802 and a second axis 804, representing orthogonal axes of the feature vector space. As explained above, the feature vector space may include more than two axes. For example, in typical implementations, a wordvec may include more than 100 different fields, and the feature vector space includes an axis for each field of the wordvecs used to form docvecs mapped to the feature vector space. Accordingly, in such implementations, the feature vector space includes more than 100 orthogonal axes. The two axes 802, 804 illustrated in FIGS. 8-11 thus represent a simplified feature vector space.

Figure 8:
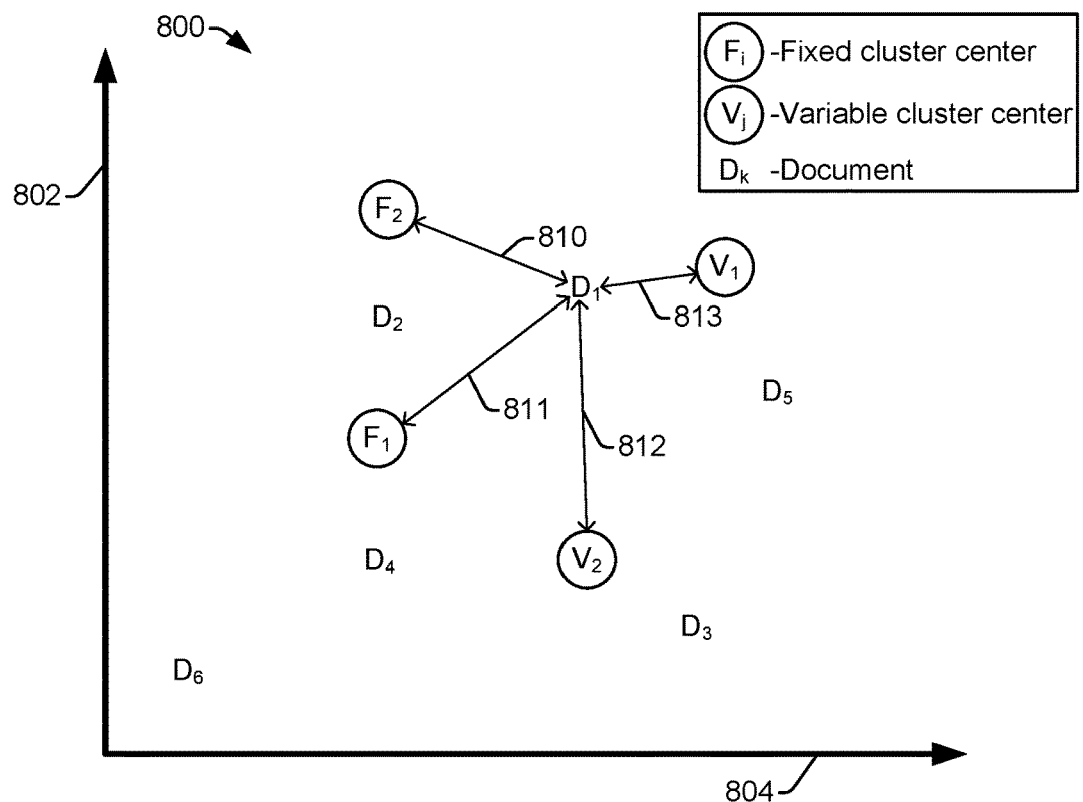
FIGS. 8, 9, 10 and 11 illustrate clustering of documents using fixed cluster centers and variable cluster centers.

Locations of multiple documents of a document corpus are illustrated in the diagram 800. As explained above, the location of a document in the feature vector space is indicated by values of fields of a docvec representing the document. For example, a location of a document D6 in the diagram 800 is indicated by mapping a value of a first field of the docvec representing the document D6 as a distance from an origin point along the first axis 802 and mapping a value of a second field of the docvec representing the document D6 as a distance from the origin point along the second axis 804, resulting in the location of the document D6 indicated in the diagram 800. The diagram 800 also indicates locations of documents D1, D2, D3, D4, and D5. The diagram 800 also illustrates initial locations selected to initiate the centroid clustering operations. The initial locations include cluster centers (denoted by circles), including fixed cluster centers F1 and F2 and variable cluster centers V1 and V2. As explained above, locations of fixed cluster centers correspond to locations of labeled documents. Thus, the fixed cluster center F1 corresponds to the location of a document assigned to a first class, and the fixed cluster center F2 corresponds to the location of a document assigned to a second class. FIG. 8 illustrates the feature vector space in an initial state (e.g., before any clusters have been determined). Thus, in FIG. 8, the locations of the variable cluster centers correspond to locations of unlabeled documents.

FIG. 8 illustrates a first stage of a clustering operation. In FIG. 8, a processor (e.g., the processor 103 executing the clustering instructions 152 of FIG. 1) selects a document and determines distances between the selected document and each cluster center. For example, FIG. 8 illustrates a distance 810 between the document D1 and the fixed cluster center F2; a distance 811 between the document D1 and the fixed cluster center F1; a distance 812 between the document D1 and the variable cluster center V2; and a distance 813 between the document D1 and the variable cluster center V1. The distances may be determined as Euclidean distances, as cosine distances (or cosine similarities), or as mutual information distances.

In the example in FIG. 8, the document D1 is closest to the variable cluster center V1. That is, the distance 813 between the document D1 and the variable cluster center V1 is smaller than each of the distance 810, the distance 811, and the distance 812. The clustering operation is configured to assign a document to a cluster corresponding to a cluster center that is closest to the document. Accordingly, in FIG. 9, the document D1 is assigned to a cluster 820 associated with the variable cluster center V1, because the variable cluster center V1 is closest to the document D1.

Figure 9:
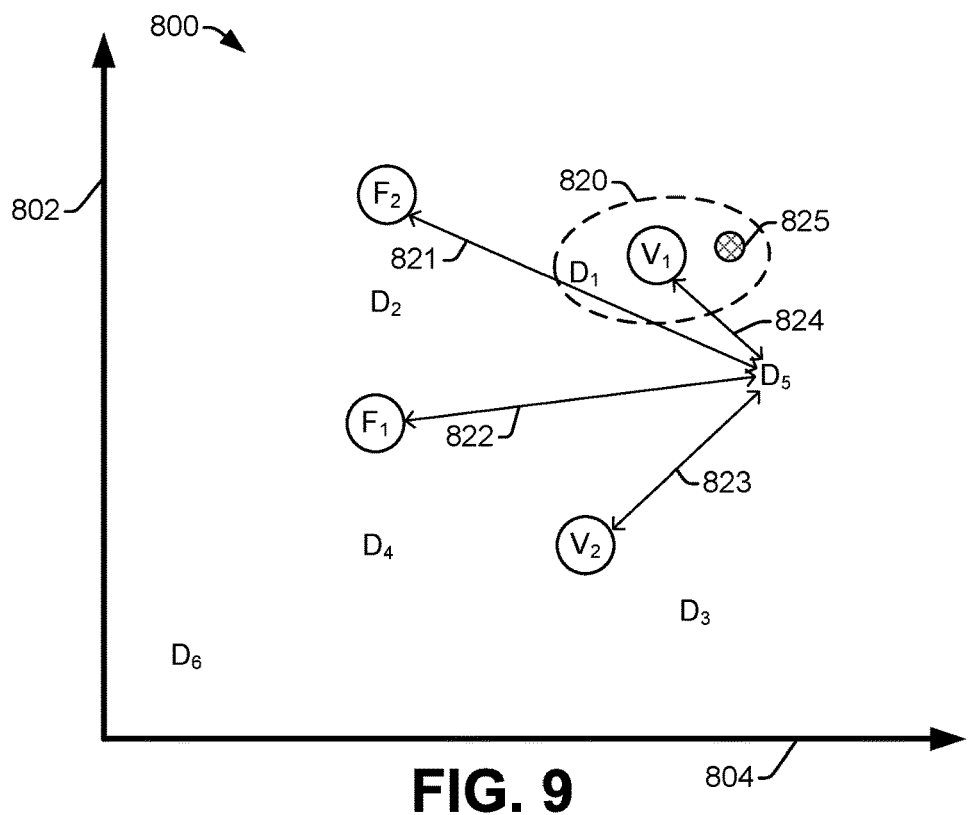

FIG. 9 also shows that after the document D1 is assigned to the cluster 820, a location of the variable cluster center V1 is calculated. For example, in FIG. 9, the cluster 820 includes two documents: the document D1 and a document 825. The document 825 was initially selected as a location of the variable cluster center V1. However, after the document D1 was added to the cluster 820, the location of the variable cluster center is recalculated as a center or centroid between locations of documents assigned to the cluster 820. Thus, in FIG. 9, the location of the variable cluster center V1 has moved relative to the location of the variable cluster center V1 in FIG. 8. In particular, in FIG. 9, the location of the variable cluster center V1 is approximately at a midpoint between the document D1 and the document 825.

FIG. 9 also illustrates a second stage of the clustering operation. In FIG. 9, the processor (e.g., the processor 103 executing the clustering instructions 152 of FIG. 1) selects another document and determines distances between the selected document and each cluster center. For example, FIG. 9 illustrates a distance 821 between the document D5 and the fixed cluster center F2; a distance 822 between the document D5 and the fixed cluster center F1; a distance 823 between the document D5 and the variable cluster center V2; and a distance 824 between the document D5 and the variable cluster center V1.

In the example of FIG. 9, the document D5 is closest to the variable cluster center V1. That is, the distance 824 between the document D5 and the variable cluster center V1 is smaller than each of the distance 821, the distance 822, and the distance 823. Accordingly, in FIG. 10, the document D5 is assigned to the cluster 820 associated with the variable cluster center V1, and the location of the variable cluster center V1 is determined as a center or centroid of the locations of the documents assigned to the cluster 820. Thus, in FIG. 10, the location of the variable cluster center V1 has moved relative to the location of the variable cluster center V1 in FIG. 8 and relative to the location of the variable cluster center V1 in FIG. 9.

Figure 10:
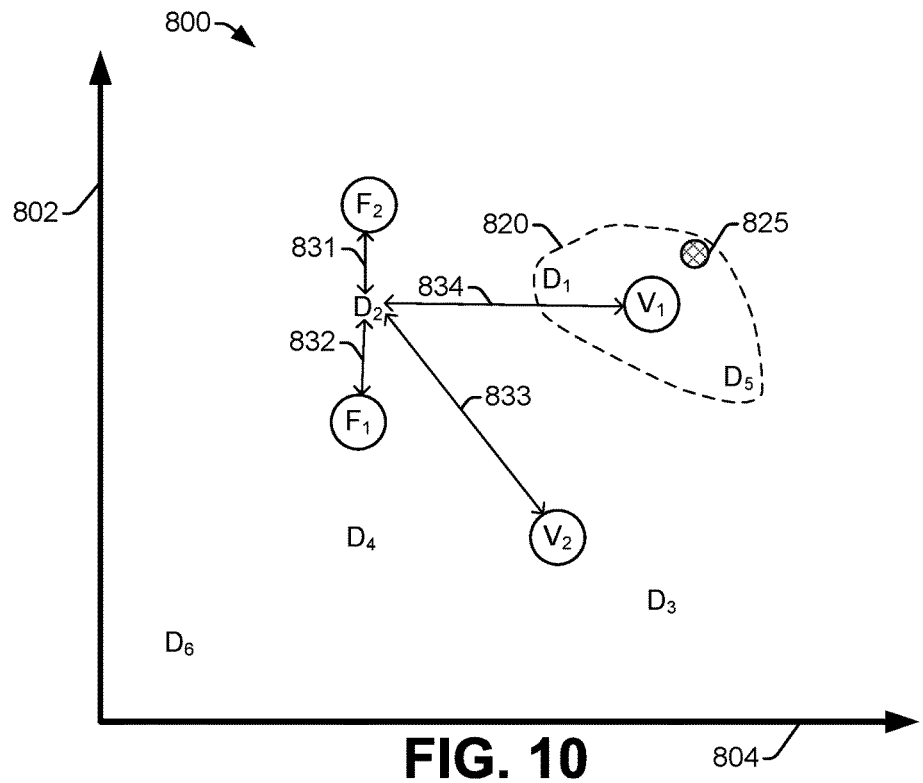

FIG. 10 illustrates a third stage of the clustering operation. In FIG. 10, the processor (e.g., the processor 103 executing the clustering instructions 152 of FIG. 1) selects another document and determines distances between the selected document and each cluster center. For example, FIG. 10 illustrates a distance 831 between the document D2 and the fixed cluster center F2; a distance 832 between the document D2 and the fixed cluster center F1; a distance 833 between the document D2 and the variable cluster center V2; and a distance 834 between the document D2 and the variable cluster center V1.

In the example of FIG. 10, the document D2 is closest to the fixed cluster center F2. That is, the distance 831 between the document D2 and the fixed cluster center F2 is smaller than each of the distance 832, the distance 833, and the distance 834. Accordingly, in FIG. 11, the document D2 is assigned to a cluster 850 associated with the fixed cluster center F2. Since the cluster 850 has a fixed cluster center (i.e., fixed cluster center F2), the location of the cluster center of the cluster 850 is not recalculated based on assignment of a document to the cluster 850. Thus, in FIG. 11, the location of the fixed cluster center F2 is the same as the location of the fixed cluster center F2 in FIGS. 8-10.

Figure 11:
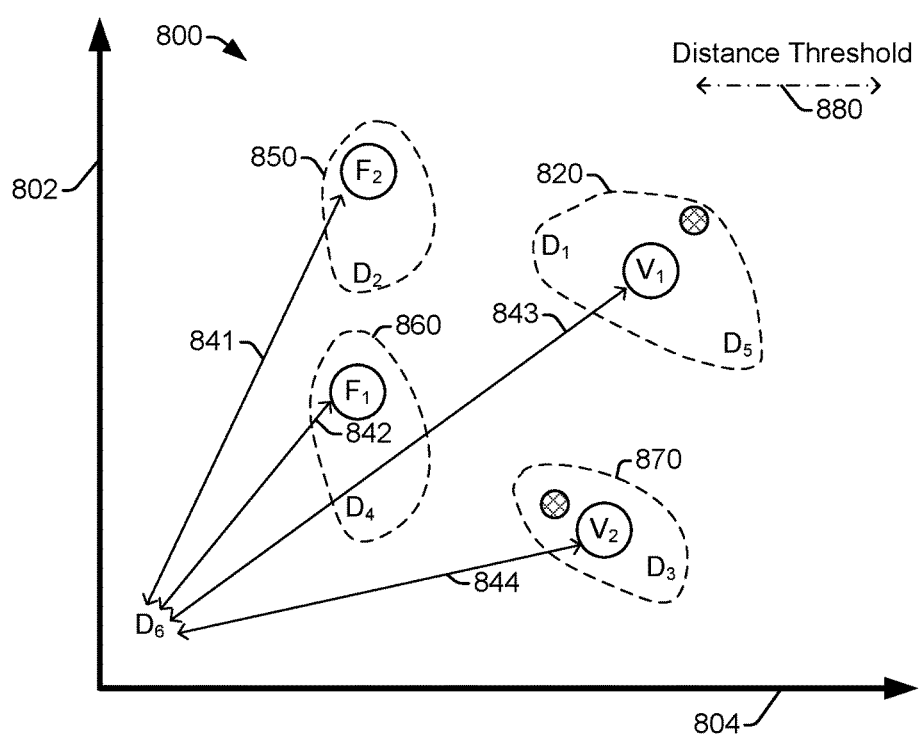

FIG. 11 illustrates a fourth stage of the clustering operation. In FIG. 11, a final document of the document corpus is selected, and the processor (e.g., the processor 103 executing the clustering instructions 152 of FIG. 1) determines distances between the final document and each cluster center. Thus, in FIG. 11, each of the documents D1, D2, D3, D4 and D5 has been assigned to a corresponding cluster of clusters 820, 850, 860, and 870 using a process as described above. FIG. 11 illustrates a distance 841 between the document D6 and the fixed cluster center F2; a distance 842 between the document D6 and the fixed cluster center F1; a distance 843 between the document D6 and the variable cluster center V1; and a distance 844 between the document D6 and the variable cluster center V2.

In the example of FIG. 11, the document D6 is closest to the fixed cluster center F1. That is, the distance 842 between the document D6 and the fixed cluster center F1 is smaller than each of the distance 841, the distance 843, and the distance 844. Accordingly, in some implementations, the document D6 may be assigned to the cluster 860 associated with the fixed cluster center F1. In implementations in which the document D6 is assigned to the cluster 860, the location of the cluster center of the cluster 860 is not recalculated based on assignment of the document D6 to the cluster 860 because the cluster 860 has a fixed cluster center (i.e., fixed cluster center F1).

In an alternative implementation, the processor (e.g., the processor 103 executing the clustering instructions 152 of FIG. 1) may compare the distances 841, 842, 843, 844 to a distance threshold 880. In such implementations, documents that are greater than the distance threshold 880 from a cluster center may not be grouped into a cluster. For example, in FIG. 11, each of the distances 841, 842, 843, 844 is greater than (e.g., longer than) the distance threshold 880. Accordingly, in FIG. 11, the document D6 may not be grouped into one of the clusters 820, 850, 860, 870. Although the distance threshold 880 is only illustrated in FIG. 11, in some implementations, the distance threshold 880 may be used when evaluating every document of a document corpus. For example, the distance threshold 880 may be compared to the distances 810, 811, 812, 813 of FIG. 8 before determining to add the document D1 to the cluster 820, may be compared to the distances 821, 822, 823, 824 of FIG. 9 before determining to add the document D5 to the cluster 820, may be compared to the distances 831, 832, 833, 834 of FIG. 10 before determining to add the document D2 to the cluster 850, and so forth.

After the clustering operations illustrated in FIGS. 8-11 are performed, the clusters in the feature vector space may be analyzed to select one or more documents to suggest that a user classify. For example, in FIG. 11, the cluster 870 is relatively distant (e.g., greater than a threshold) from the fixed cluster centers F1 and F2, and the cluster 870 has a relatively high concentration (e.g., greater than a threshold) of unlabeled documents. The distance between the cluster 870 and the fixed cluster centers F1 and F2 and the relatively high concentration of unlabeled documents in the cluster 870 may indicate that the cluster 870 represents a previously unidentified class of documents or a subclass of a user-defined class. Accordingly, in this example, the clustering instruction 152 may select a document from the cluster 870 (such as the document D3) and prompt the user to classify the selected document to facilitate classification of other documents in the cluster 870.

As another example, in FIG. 10, the distance 831 between the document D2 and the fixed cluster center F2 is nearly equal to (e.g., within a threshold difference of) the distance 832 between the document D2 and the fixed cluster center F1. Thus, the document D2 is near a boundary between the clusters 850 and 860. A manual classification of the document D2 may help identify distinguishing characteristics between the clusters 850 and 860. Accordingly, the user may be prompted to classify the document D2 to provide supervised training data to build the document classifier.

The clustering operations of FIGS. 8-11 illustrate use of centroid clustering to facilitate generation of a more accurate document classifier. However, as explained above, other types of clustering operations may be used. For example, the clustering instructions 152 may use connectivity clustering operations, density clustering operations, or distribution clustering operations. Further, the clustering operations illustrated in FIGS. 8-11 may be used to prompt the user to classify a relatively small portion of the document corpus (e.g., only those documents that are expected to significantly improve the resulting document classifier). For example, an unguided user (e.g., a user that does not benefit from use of the clustering instructions 152) may select documents for classification based on criteria that are not relevant to the accuracy of the resulting document classifier. To illustrate, the unguided user may classify documents based on how easily the documents can be classified or how easily the documents can be accessed. While classifying each individual document using such criteria may be simple, building a reliable document classifier using such criteria for document selection may require the user to classify a large number of documents. Thus, the unguided user may end up classifying more documents to generate a document classifier or may generate a less accurate document classifier than a user guided by results of the clustering instructions 152. For example, the clustering operations illustrated in FIGS. 8-11 may be used to select fewer documents for manual classification, and the supervised training data generated based on manual classification of the selected documents may significantly improve performance of the resulting document classifier since documents selected for classification are selected based on criteria relevant to generation of an accurate document classifier.

Figure 12:
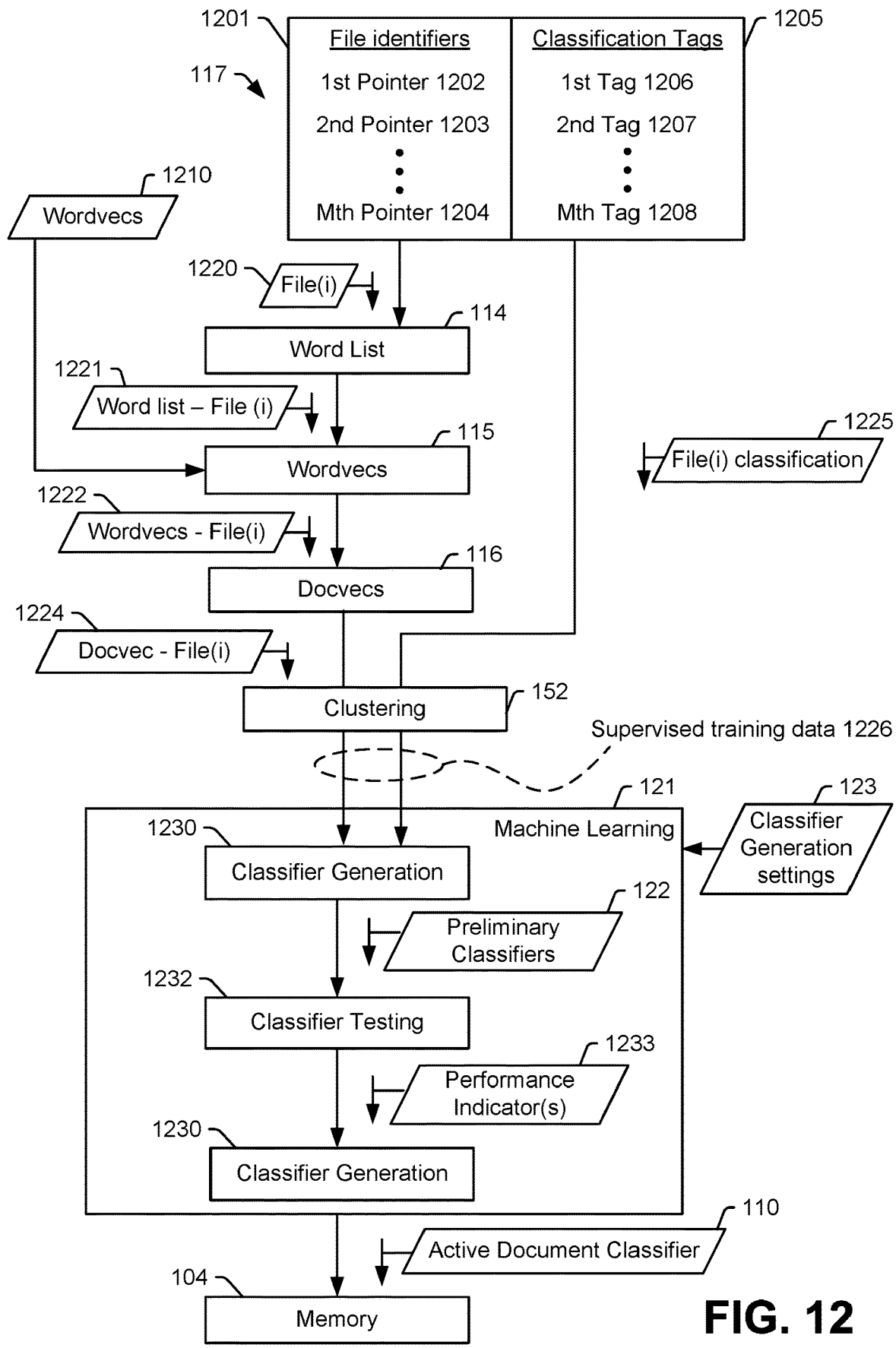
FIG. 12 illustrates a process for generating a document classifier based on user input.

FIG. 12 illustrates a process for generating a document classifier based on user input. The process illustrated in FIG. 12 may be performed by the computing device 102, such as by the processor 103 executing the classifier generation instructions 106.

In FIG. 12, the classification data 117 includes file identifiers 1201 and corresponding classification tags 1205. For example, the classification data 117 includes a first pointer 1202 indicating a storage location of a first document and a first tag 1206 indicating a classification assigned to the first document. The classification data 117 also includes a second pointer 1203 indicating a storage location of a second document and a second tag 1207 indicating a classification assigned to the second document. The classification data 117 may also include one or more additional pointers, such as an Mth pointer 1204 indicating a storage location of an Mth document and one or more additional tags, such as an Mth tag 1208 indicating a classification assigned to the Mth document. The classification data 117 may be stored in a memory, such as the memory 104, based on user input provided via a GUI, such as the GUI 130 of FIGS. 1-7.

The pointers 1202-1204 are used to access the documents from a data store. For example, a particular file 1220 (e.g., the first file) may be accessed from a storage location indicated by a pointer (e.g., the first pointer 1202) to the particular file 1220 in the classification data 117. The particular file 1220 may be analyzed by the word list instructions 114 to determine a word list 1221 of the particular file 1220. The word list 1221 of the particular file 1220 indicates words that appear in the particular file 1220. The word list 1221 may also indicate a count or frequency of occurrence of each word in the particular file 1220.

The word list 1221 of the particular file 1220 is provided to the wordvec instructions 115. The wordvec instructions 115 access wordvecs 1210 in a memory (e.g., the memory 104) and generate a set of wordvecs 1222 corresponding to the words in the word list 1221. For example, if the word list 1221 includes the words "a," "be," and "sea," the wordvec instructions 115 select a wordvec for the word "a," a wordvec for the word "be," and a wordvec for the word "sea" for inclusion in the set of wordvecs 1222 for the particular file 1220.

The docvec instructions 116 use the set of wordvecs 1222 for the particular file 1220 to generate a docvec 1224 for the particular file 1220. For example, the docvec instructions 116 may mathematically aggregate the wordvecs of the set of wordvecs 1222 to generate the docvec 1224. A particular example of a method of generating a docvec is described with reference to FIG. 13.

In some implementations, the docvecs may be used by the clustering instructions 152 to map each document of a document corpus into a feature vector space. The clusters in the feature vector space may be analyzed to select one or more documents, and the user may be prompted to manually classify the selected one or more documents. The one or more documents are selected, based on the clusters, to improve the performance of a resulting document classifier, to reduce the amount of time and effort users spend classifying documents, or both. For example, if the clustering identifies a group of documents that are in a region of the feature vector space that is distant from a fixed cluster center and that has a relatively high concentration of unlabeled documents, the group may represent a previously unidentified class of documents or a subclass of a user-defined class. Accordingly, in this example, the clustering instruction 152 may select a document from the group and prompt the user to classify the selected document to facilitate classification of other documents in the group. As another example, a document that is in a boundary region between two clusters may be selected for classification to clarify distinguishing characteristics of the two clusters.

After a user classifies any documents selected based on clusters generated by the clustering instructions 152, the docvecs and classifications tags 1205 may be used as supervised training data. For example, in FIG. 12, the docvec 1224 and the file classification data 1225 for the particular file 1220 are provided as supervised training data 1226 to the machine learning instructions 121. In FIG. 12, the machine learning instructions 121 include classifier generation instructions 1230 and classifier testing instructions 1232. The classifier generation instructions 1230 use a first portion of the supervised training data 1226 to generate multiple preliminary document classifiers 122. For example, the classifier generation instructions 1230 may, based on the classifier generation settings 123, generate one or more neural network document classifiers, one or more decision tree classifiers, one or more support vector machine classifiers, one or more regression document classifiers, one or more naive Bayes document classifiers, one or more perceptron document classifiers, etc.

The classifier testing instructions 1232 use a second portion of the supervised training data 1226 to test performance of each of the preliminary document classifiers 122. For example, the classifier testing instructions 1232 determine a performance metric or multiple performance metrics for each of the preliminary document classifiers 122 and provide a performance indicator 1233 or performance indicators to the classifier generation instructions 1230. The performance indicator 1233 or performance indicators may indicate values of the performance metrics. Additionally. or in the alternative, the performance indicator 1233 or performance indicators may identify the best performing preliminary document classifier of the preliminary document classifiers 122. The best performing document classifier may be selected based on classification accuracy, processing time, complexity, or other factors.

Based on the performance indicator 1233 or the performance indicators, the classifier generation instructions 1230 generate the active document classifier 110. In a particular implementation, the classifier generation instructions 1230 generate the active document classifier 110 by designating the best performing preliminary document classifier as the active document classifier 110. In another particular implementation, the classifier generation instructions 1230 use a portion of the classifier generation settings 123 associated with the best performing preliminary document classifier and the supervised training data 1226 to generate a new classifier, which is designated the active document classifier 110. In this implementation, the preliminary document classifiers 122 are used to identify which type of document classifier and which classifier generation settings work best for a particular document corpus by dividing the supervised training data 1226 into a training portion and a test portion. After identifying classifier parameters (e.g., a type of document classifier and classifier generation settings) that work best for the particular document corpus, the classifier generation instructions 1230 generate the active document classifier 110 using the classifier parameters and the entire set of supervised training data 1226. Thus, the active document classifier 110 may be trained using a larger set of supervised training data, which is expected to improve the accuracy of classifications assigned by the active document classifier 110. The active document classifier 110 is stored in the memory 104 for use in classifying documents that were not manually classified to generate the classification data 117.

Figure 13:
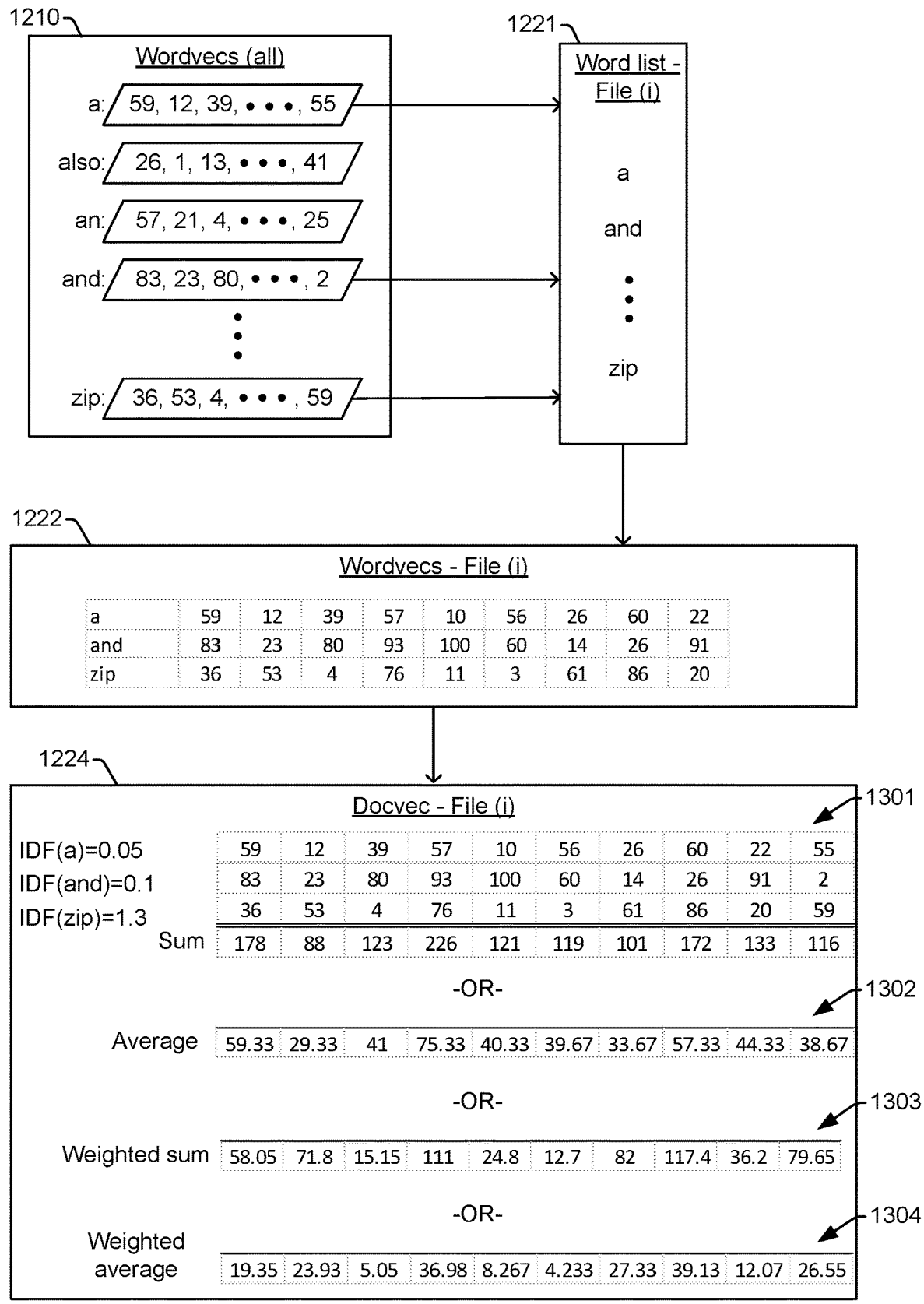
FIG. 13 illustrates details of particular aspects of the process for generating a document classifier based on user input of FIG. 12.

FIG. 13 illustrates details of particular aspects of the process for generating a document classifier based on user input of FIG. 12. In particular, FIG. 13 illustrates an example of generating the set of wordvecs 1222 for a particular file 1220 and several examples of generating a docvec based on the set of wordvecs 1222.

In FIG. 13, a memory includes wordvecs 1210 for a document corpus. The document corpus used to generate the wordvecs 1210 may be independent of the documents that are to be classified by the document classifier. For example, the wordvecs 1210 may be generated based on a selection of publicly available documents in the same language as the documents to be classified. To illustrate, in some examples, the wordvecs 1210 may be accessed from a commercial or academic source of natural language processing data.

The wordvec instructions 115 of FIGS. 1 and 12 may select particular wordvecs from the wordvecs 1210 based on the word list 1221 for the particular document. To illustrate, in FIG. 13, the word list 1221 includes the words "a," "and," and "zip." Accordingly, the wordvec instructions 115 generate the set of wordvecs 1222 for the particular document by selecting, from the wordvecs 1210, wordvecs corresponding to the words "a," "and," and "zip."

The docvec instructions 116 of FIGS. 1 and 12 generate the docvec 1224 by mathematically aggregating the wordvecs 1222 for the particular document. FIG. 13 illustrated four examples 1301-1304 of mathematically aggregating the wordvecs 1222 to generate the docvec 1224. In a first example 1301, the wordvecs 1222 are added together. To illustrate, each wordvec includes a plurality of fields, and the wordvecs 1222 are added field-by-field. Thus, in the first example 1301, a first field of the wordvec corresponding to the word "a," a first field of the wordvec corresponding to the word "and," and a first field of the wordvec corresponding to the word "zip," are added to generate a value of 178 for a first field of the docvec. Likewise, a second field of the wordvec corresponding to the word "a," a second field of the wordvec corresponding to the word "and," and a second field of the wordvec corresponding to the word "zip," are added to generate a value of 88 for a second field of the docvec. The field-by-field addition continues to generate a value for each field of the docvec 1224.

In a second example 1302, the wordvecs 1222 are averaged field-by-field. Thus, in the second example 1302, a first field of the wordvec corresponding to the word "a," a first field of the wordvec corresponding to the word "and," and a first field of the wordvec corresponding to the word "zip," are added to generate a sum, and the sum is divided by a number of wordvecs added (in this case 3) to generate a value of 59.33 for a first field of the docvec 1224. The field-by-field averaging continues to generate a value for each field of the docvec 1224.

The third example 1303 and the fourth example 1304 use weighted aggregation of the wordvecs 1222. To illustrate, in the third example 1303, the docvec 1224 corresponds to a field-by-field weighted sum of the wordvecs 1222, and in the fourth example 1304, the docvec 1224 corresponds to a field-by-field weighted average of the wordvecs 1222. Weighting values for the third example 1303 and the fourth example 1304 are determined based on an indicator of specificity of each word in the set of documents to be classified. For example, the weighting values may include an inverse document frequency value for each word. In other examples, other measures of specificity of each word may be used as weighting values.

FIG. 14 is a flowchart illustrating a particular example of a method 1400 of generating a document classifier based on user input. The method 1400 may be performed by a computing device, such as the computing device 102 of FIG. 1 executing the classifier generation instructions 106.

The method 1400 includes, at 1401, receiving, via a graphical user interface (GUI) including a plurality of document elements and a plurality of class elements (e.g., folder icons), user input associating a first document element of the plurality of document elements with a first class element of the plurality of class elements. Each document element of the GUI represents a corresponding document of a plurality of documents and each class element of the GUI represents a corresponding class of a plurality of classes. For example, in FIG. 1, the GUI 130 includes a plurality of document elements (e.g., the document icons 136-138) representing a plurality of documents (e.g., documents Doc 1, Doc 2, and Doc 3), and the GUI 130 includes a plurality of class elements (e.g., the folder icons 141-144) representing classes (e.g., the classes Class 1, Class 2, Class 2.1, and Class 2.2). In this example, the GUI 130 is configured to receive user input, such as a drag-and-drop operation, to move a document icon to a folder icon. Moving the document icon to the folder icon indicates assignment of a document represented by the document icon to a class represented by the folder icon.

The method 1400 includes, at 1402, generating a document classifier using supervised training data, the supervised training data indicating, based on the user input, that a first document represented by the first document element is assigned to a first class associated with the first class element. For example, in FIG. 1, the classifier generation instructions 106 include the feature extraction instructions 113, which are configured to generate supervised training data including a docvec and a classification (e.g., a tag) for each document. The machine learning instructions 121 of FIG. 1 are configured to generate one or more document classifiers based on the supervised training data.

Figure 15:
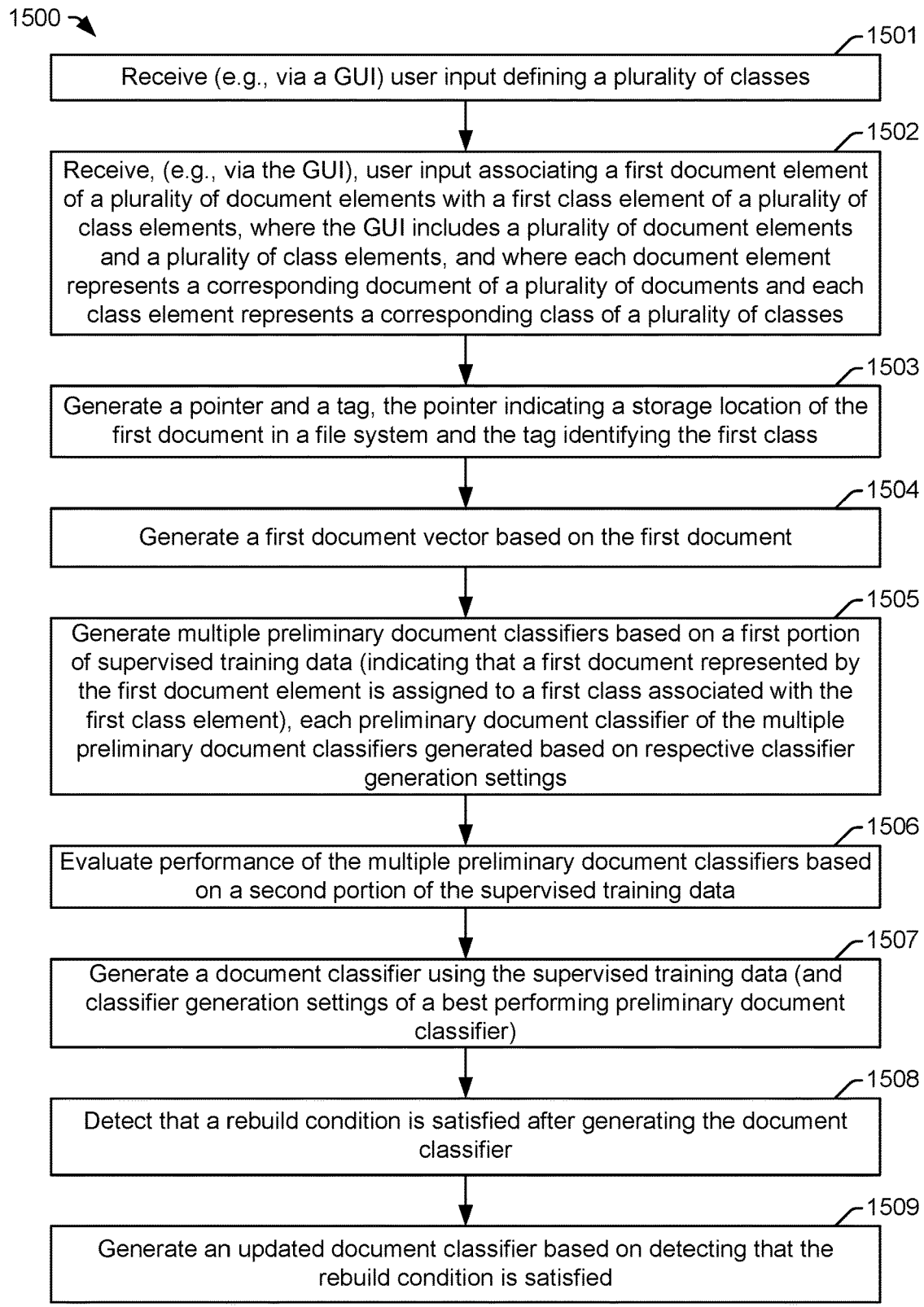
FIG. 15 is a flowchart illustrating a particular example of a method of generating a document classifier based on user input.

FIG. 15 is a flowchart illustrating another particular example of a method 1500 of generating a document classifier based on user input. The method 1500 may be performed by a computing device, such as the computing device 102 of FIG. 1 executing the classifier generation instructions 106.

The method 1500 includes, at 1501, receiving user input defining a plurality of classes. For example, the user input may include a selection to create a new folder and information designating a name of the new folder, where the name of the new folder corresponds to an identifier of a new class of the plurality of classes. In some implementations, the user input may be received via a graphical user interface (GUI), such as the GUI 130 which includes a plurality of folder icons 141-144 representing user-defined classes. The classes may be generated using file system like operations, as described with reference to FIGS. 2-4.

The method 1500 includes, at 1502, receiving, via a GUI including a plurality of document elements and a plurality of class elements (e.g., folder icons), user input associating a first document element of the plurality of document elements with a first class element of the plurality of class elements. The GUI is based on the user input defining the plurality of classes. Each document element of the GUI represents a corresponding document of a plurality of documents and each class element of the GUI represents a corresponding class of a plurality of classes. For example, in FIG. 1, the GUI 130 includes a plurality of document elements (e.g., the document icons 136-138) representing a plurality of documents (e.g., documents Doc 1, Doc 2, and Doc 3), and the GUI 130 includes a plurality of class elements (e.g., the folder icons 141-144) representing classes (e.g., the classes Class 1, Class 2, Class 2.1, and Class 2.2). In this example, the GUI 130 is configured to receive user input, such as a drag-and-drop operation, to move a document icon to a folder icon. Moving the document icon to the folder icon indicates assignment of a document represented by the document icon to a class represented by the folder icon.

The method 1500 includes, at 1503, generating a pointer and a tag, where the pointer indicates a storage location of the first document in a file system and the tag identifies the first class. For example, in FIG. 1, the classification data 117 includes entries 118-120, each of which includes a pointer to a respective document, and a tag indicating a class to which the respective document is assigned.

The method 1500 includes, at 1504, generating a first document vector based on the first document. For example, in FIG. 1, the feature extraction instructions 113 are executable to generate document vectors based on the classification data 117. FIGS. 12 and 13 describe generation of a document vector in more detail.

The method 1500 includes, at 1505, generating multiple preliminary document classifiers based on a first portion of supervised training data (indicating that a first document represented by the first document element is assigned to a first class associated with the first class element). Each preliminary document classifier of the multiple preliminary document classifiers is generated based on respective classifier generation settings. For example, the multiple preliminary document classifiers may correspond to the preliminary document classifiers 122 of FIG. 1 and FIG. 12. In this example, each of the preliminary document classifiers 122 is generated based on a training portion of the supervised training data 1226 of FIG. 12, and based on a portion of the classifier generation settings 123. To illustrate, a first preliminary document classifier of the multiple preliminary document classifiers 122 may be a first type of document classifier generated using a first machine learning process and using a first subset of the classifier generation settings 123 related to the first machine learning process. A second preliminary document classifier of the multiple preliminary document classifiers 122 may be a second type of document classifier generated using a second machine learning process and using a second subset of the classifier generation settings 123 related to the second machine learning process. The supervised training data includes the document vector generated based on the first document and a user assigned class associated with the first document.

The method 1500 includes, at 1506, evaluating performance of the multiple preliminary document classifiers based on a second portion of the supervised training data. For example, the classifier testing instructions 1232 of FIG. 12 may provide input docvecs based on a test portion of the supervised training data 1226 to each of the multiple preliminary document classifiers 122. Each preliminary document classifier may generate a classification result based on each of the input docvecs. The classifier test instructions 1232 may compare each classification result to the user assigned file classification (e.g., the file classification data 1225) associated with a corresponding docvec. A performance metric may be determined for each of the preliminary document classifiers 122. The performance metric may indicate, for example, how accurately the classification results generated by each preliminary document classifier matched the user assigned file classifications. The performance metric may also indicate processing time, complexity, or other characteristics of each of the preliminary document classifiers 122. A best performing preliminary document classifier may be selected based on the performance metric(s).

The method 1500 includes, at 1507, generating a document classifier (e.g., the active document classifier of FIGS. 1 and 12) using the supervised training data and classifier generation settings of the best performing preliminary document classifier. For example, the classifier generation instruction 1230 may generate the active document classifier 110 using classifier generation settings associated with the best performing preliminary document classifier and using the supervised training data 1226. Thus, the active document classifier 110 may be of the same type and use the same classifier parameters as the best performing preliminary document classifier; however, the active document classifier may be trained using a larger subset of or the entirety of the supervised training data 1226. As a result of the larger training data set of the active document classifier 110 (as compared to the training data portion used to generate the best performing preliminary document classifier), the active document classifier 110 should generate more accurate classification results than the best performing preliminary document classifier. Thus, the classifier generation instructions 106 enable a user who is not a data scientist to generate a reliable document classifier. Because the user is not a trained data scientist, the user may not have the expertise to select the best type of document classifier for a particular document corpus. Generating multiple different types of preliminary document classifiers using different classifier generation settings and testing the performance of each preliminary document classifier enables selection of a best performing type of document classifier and corresponding parameters without relying on a data scientist.

The method 1500 includes, at 1508, detecting that a rebuild condition is satisfied after generating the document classifier (e.g., after designating the active document classifier). For example, after the active document classifier 110 has been in use for a period of time, a rebuild condition may be satisfied. The rebuild condition being satisfied may indicate that reliability of the active document classifier 110 is suspect. For example, the rebuild condition may be satisfied when a threshold number of document classified by the active document classifier 110 have been manually reclassified. As another example, the rebuild condition may be satisfied when a significant change (e.g., greater than a threshold) is detected in the distribution of classifications made by the active document classifier 110. The rebuild condition may be specified in settings associated with the machine learning instructions 121, such as via the settings selectable option 602 of FIG. 6.

The method 1500 includes, at 1509, generating an updated document classifier based on detecting that the rebuild condition is satisfied. For example, the classifier generation instructions 106 of FIG. 1 may automatically execute to generate an updated document classifier based on detecting that the rebuild condition is satisfied. In another example, the classifier generation instructions 106 of FIG. 1 may prompt a user to initiate generation of the updated document classifier based on detecting that the rebuild condition is satisfied. The updated document classifier may be generated based on supervised training data based at least in part on manual document classifications received via the GUI 130 after the active document classifier 110 was generated.

When an updated document classifier is generated, the updated document classifier is generated based on second supervised training data. The second supervised training data may be distinct from the supervised training data used to generate the active document classifier. For example, the supervised training data used to generate the active document classifier may include first data indicating that each document of a first set of documents is assigned to one or more classes of a first set of classes, and the second supervised training data may include second data indicating that each document of a second set of documents is assigned to one or more classes of a second set of classes, where the first set of classes is different from the second set of classes. As another example, the supervised training data used to generate the active document classifier may include first data indicating that each document of a first set of documents is assigned to one or more classes of a first set of classes, and the second supervised training data may include second data indicating that each document of a second set of documents is assigned to one or more classes of a second set of classes, where the first set of documents is different from the second set of documents. As yet another example, the supervised training data used to generate the active document classifier may include first data indicating that each document of a first set of documents is assigned to one or more classes according to a first hierarchical arrangement, and the second supervised training data may include second data indicating that each document of a second set of documents is assigned to one or more classes according to a second hierarchical arrangement, where the first hierarchical arrangement is different from the second hierarchical arrangement.

Figure 16:
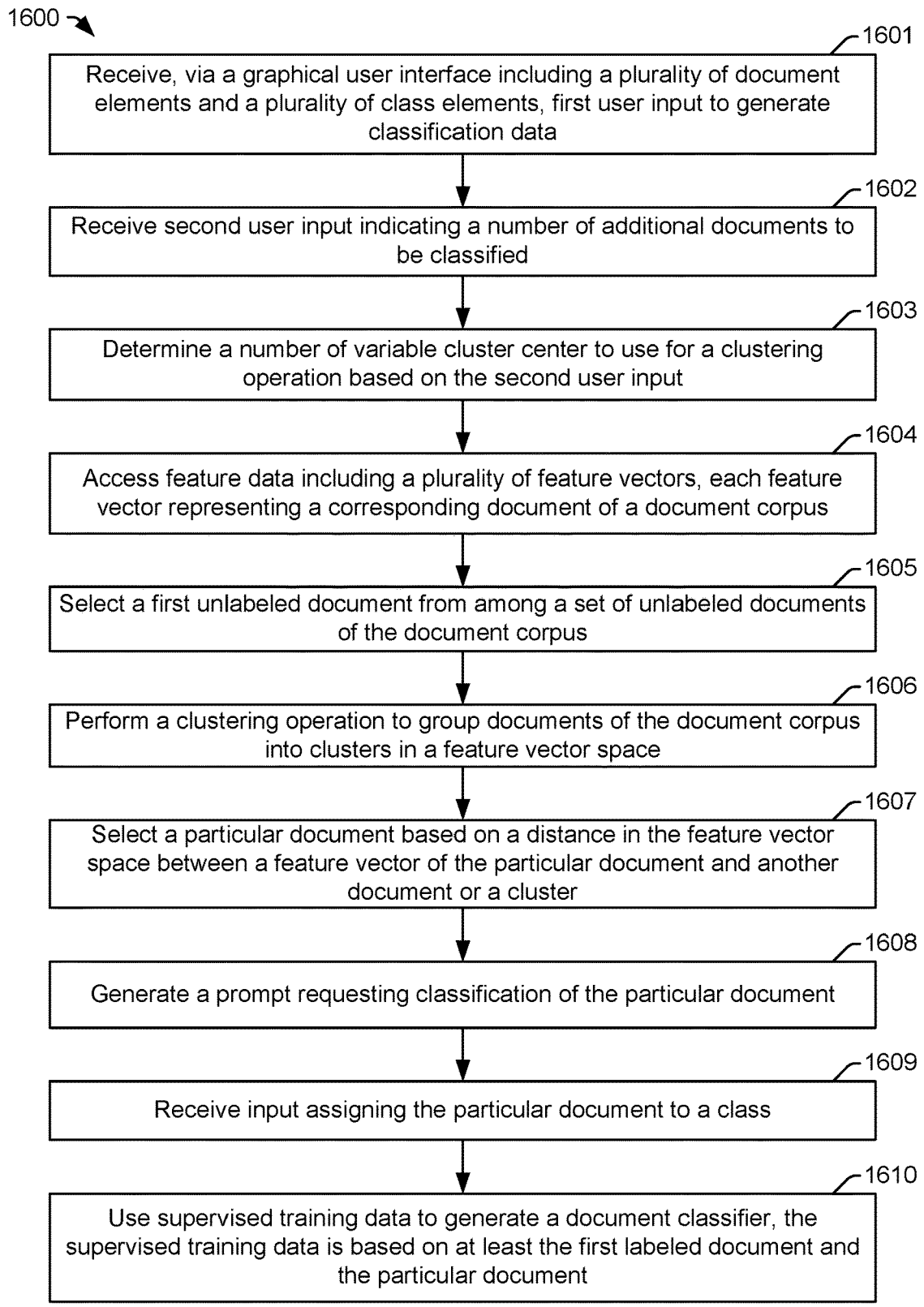
FIG. 16 is a flowchart illustrating yet another particular example of a method of generating a document classifier based on user input.

FIG. 16 is a flowchart illustrating yet another particular example of a method 1600 of generating a document classifier based on user input. The method 1600 may be performed by a computing device, such as the computing device 102 of FIG. 1 executing instructions from the memory 104. For example, the method 1600 may be performed by the clustering instructions 152 in cooperation with other portions of the classifier generation instructions 106 of FIG. 1.

The method 1600 includes, at 1601, receiving, via a graphical user interface including a plurality of document elements and a plurality of class elements, first user input to generate classification data. For example, the first user input may include user input to define a plurality of classes, to assigning one or more documents to the classes, or both, using a graphical user interface, such as the GUI 130 of FIG. 1. For each document classified by the user, the classification data may include a label or tag indicating which class the user assigned the document to.

The method 1600 also includes, at 1602, receiving second user input indicating a number of additional documents to be classified. For example, as illustrated in FIG. 7, the GUI 130 user may indicate a prompt or other user selectable option to indicate a number of additional documents to be classified. In some implementations, the clustering instructions 152 may specify a default number of additional documents to be classified, which may be used if the user initiates clustering without specifying (via the prompt 702) the number of additional documents to be classified.

In implementations that use centroid clustering operations, the method 1600 may include, at 1603, determining a number of variable cluster center to use for a clustering operation based on the second user input. For example, the number of variable cluster center to use for the clustering operation may be equal to the number of additional documents to be classified specified by the user. In some examples, the number of variable cluster center to use for the clustering operation may be different than the number of additional documents to be classified specified by the user. To illustrate, in some implementations, multiple instances of the clustering instruction 152, using different numbers of variable cluster centers, may be executed in series or in parallel. For example, in such implementations, a first instance of the clustering instructions 152 may cluster the documents of the document corpus using three (3) variable cluster centers (and a number of fixed cluster centers based on the number of classes defined by the user), a second instance of the clustering instructions 152 may cluster the documents of the document corpus using four (4) variable cluster centers (and a number of fixed cluster centers based on the number of classes defined by the user), and a third instance of the clustering instructions 152 may cluster the documents of the document corpus using five (5) variable cluster centers (and a number of fixed cluster centers based on the number of classes defined by the user). In such implementations, as a result of starting with a different number of cluster centers, the various instances of the clustering instructions 152 will generate different groupings of documents into clusters. The different groupings may be analyzed to select documents to suggest for classification by the user. For example, one document or group of documents may be near a boundary between two clusters based on groupings by more than one of the instances of the clustering instructions 152, which may indicate that classifying the document or a document from the group would improve sensitivity and/or specificity of the resulting document classifier. In other implementations, multiple instances of the clustering instructions 152 may use the same number of variable clusters centers, which may also improve sensitivity and/or specificity of the resulting document classifier.

The method 1600 includes, at 1604, accessing feature data including a plurality of feature vectors, each feature vector representing a corresponding document of a document corpus. For example, the feature vectors may include or correspond to docvecs, which may be determined as described with reference to FIGS. 12 and 13.

The method 1600 includes, at 1605, selecting a first unlabeled document from among a set of unlabeled documents of the document corpus. In some implementations, the first unlabeled document is selecting randomly or pseudo randomly from among a set of unlabeled documents. In other implementations, the first unlabeled document is selected from among the set of unlabeled documents based on a location of the first unlabeled document in the feature vector space relative to locations of one or more cluster centers, based on a concentration of unlabeled documents in the feature vector space, or based on a combination thereof. A location of the first unlabeled document in the feature vector space may be designated an initial location for clustering. For example, if the clustering instructions 152 use centroid clustering operations, the location of the first unlabeled document may be designated as a variable cluster center. In addition to designating a variable cluster center corresponding to the location of the first unlabeled document, one or more other variable cluster centers may also be designated. For example, a number of variable cluster centers correspond to the number determined at 1603 may be selected. Initially, each of the variable cluster centers may correspond to a location of an unlabeled document of the document corpus. If the clustering instructions 152 use connectivity clustering operations or density clustering operations, the location of the first unlabeled document may be designated as a starting point for generating a cluster.

The method 1600 includes, at 1606, performing a clustering operation (e.g., a centroid clustering operation, a density clustering operation, a connectivity clustering operation, or a distribution clustering operation) to group documents of the document corpus into clusters in a feature vector space. As an example, a centroid clustering operation may be based on one or more fixed cluster centers and the variable cluster centers. For example, the fixed cluster centers may include a first fixed cluster center corresponding to a first labeled document of the document corpus and a second fixed cluster center corresponding to a second labeled document of the document corpus. In this example, the first labeled document may be assigned to a first class in classification data associated with the document corpus, and the second labeled document may be assigned to a second class in classification data associated with the document corpus, where the first class is distinct from the second class.

Performing the clustering operation may include iteratively (or repeatedly) updating a location of each variable cluster center in the feature vector space while holding constant a location of each fixed cluster center in the feature vector space. As a particular example, performing the clustering operation may include identify a closest cluster center to a particular document in the feature vector space. To illustrate, as explained with reference to FIGS. 8-11, a distance between the document and each document center may be calculated, and the document may be associated with (e.g., assigned to) a cluster corresponding to the closest cluster center. If the closest cluster center is a variable cluster center, the location of the variable cluster center may be updated after the document is associated with the cluster. For example, an updated position of the variable cluster center may be determined based on a location of the document and locations of each other document assigned to the cluster. As explained with reference to FIGS. 8-11, locations of fixed cluster centers are not updated when new documents are assigned to clusters associated with the fixed cluster centers.

After the clustering operation is performed and the documents are grouped into clusters, one or more of the documents may be selected to suggest to the user for classification. For example, the method 1600 may include, at 1607, selecting a particular document based on a distance in the feature vector space between a feature vector of the particular document and another document or a cluster, and, at 1608, generating a prompt requesting classification of the particular document. In some implementations, if the location of the particular document is greater than a threshold distance from a cluster corresponding to a user-defined class, a prompt may be generated to recommend that the user consider generating a new class or sub-class corresponding to the particular document.

The method 1600 includes, at 1609, receiving input assigning the particular document to a class. After the particular document is assigned to the class based on the input, the method 1600 may repeat selecting documents and generating prompts requesting classification of the selected documents until the number of additional documents to be classified is satisfied.

After receiving user input to classify the additional documents, the method 1600 includes, at 1610, using supervised training data to generate a document classifier. The supervised training data include information (e.g., classification or labels) generated in response to prompting the user to classify additional documents. For example, the supervised training data is based on at least the first labeled document (the location of which is used as the first fixed cluster center) and the particular document selected at 1607.

The systems and methods illustrated herein may be described in terms of functional block components, screen shots, optional selections and various processing steps. It should be appreciated that such functional blocks may be realized by any number of hardware and/or software components configured to perform the specified functions. For example, a system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Methods disclose herein may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of generating a trained file classifier, the method comprising:
    performing, by a computing device, a clustering operation to group at least a subset of documents of a first document corpus into clusters in a feature vector space, the first document corpus including one or more labeled documents and one or more unlabeled documents, wherein each of the one or more labeled documents is assigned to a corresponding class in classification data associated with the first document corpus and wherein each of the one or more unlabeled documents is not assigned to any class in the classification data;
    after performing the clustering operation, selecting a particular document of the one or more unlabeled documents for manual classification based on a number of labeled documents in a cluster associated with the particular document failing to satisfy a threshold or based on the particular document being located in the feature vector space in a boundary region between two clusters, wherein the manual classification of the particular document is expected to facilitate training of the trained file classifier based on a distance in the feature vector space between the particular document and a labeled document of the one or more labeled documents;
    generating, by the computing device, a prompt requesting the manual classification of the particular document;
    assigning, by the computing device, a particular label to the particular document based on input responsive to the prompt;
    after assigning the particular label to the particular document, generating the trained file classifier using machine learning based on a supervised training data set that includes the one or more labeled documents and the particular document; and
    storing, by the computing device, the trained file classifier for use in classifying a second document corpus that is related to the first document corpus.

2. The method of claim 1, wherein the clustering operation is performed based on a first fixed cluster center corresponding to a first labeled document of the one or more labeled documents and based on a first variable cluster center corresponding to a first unlabeled document of the one or more unlabeled documents, and the distance between the particular document and the labeled document corresponds to a distance between the particular document and the first fixed cluster center.

3. The method of claim 2, wherein the clustering operation is further based on at least one second fixed cluster center and at least one second variable cluster center, the at least one second fixed cluster center determined based on at least one second labeled document, and the at least one second variable cluster center based on at least one second particular document of the one or more unlabeled documents.

4. The method of claim 3, wherein the first labeled document is assigned to a first class in the classification data and the at least one second labeled document is assigned to a second class in the classification data, the second class distinct from the first class.

5. The method of claim 2, further comprising, before performing the clustering operation:
    receiving input indicating a number of documents to be classified; and
    determining a number of variable cluster centers to use for the clustering operation based on the input.

6. The method of claim 2, wherein performing the clustering operation includes iteratively updating a location of each variable cluster center in the feature vector space while holding constant a location of each fixed cluster center in the feature vector space.

7. The method of claim 2, further comprising, before performing the clustering operation:
    randomly selecting a first unlabeled document from among the one or more unlabeled documents of the first document corpus; and
    designating a location of the first unlabeled document in the feature vector space as the first variable cluster center.

8. The method of claim 2, further comprising, before performing the clustering operation:
    analyzing locations in the feature vector space of a set of unlabeled documents of the first document corpus;
    selecting the first unlabeled document from among the set of unlabeled documents based on a location of the first unlabeled document in the feature vector space relative to locations of one or more cluster centers, based on a concentration of unlabeled documents in the feature vector space, or based on a combination thereof; and
    designating the location of the first unlabeled document in the feature vector space as the first variable cluster center.

9. The method of claim 2, wherein performing the clustering operation includes:
    identifying a closest cluster center to a document in the feature vector space;
    associating the document with a cluster corresponding to the closest cluster center; and
    based on determining that the closest cluster center is a variable cluster center, determining an updated position of the variable cluster center based on a location of the document and locations of each other document assigned to the cluster.

10. The method of claim 1, further comprising, before performing the clustering operation, accessing feature data including a plurality of feature vectors, each feature vector representing a corresponding document of the first document corpus, wherein the clustering operation generates the clusters based on locations of the documents in the feature vector space.

11. The method of claim 1, wherein the clusters include a first cluster associated with a user-defined class and a second cluster that is not associated with a user-defined class.

12. The method of claim 1, wherein, based on the distance between the particular document and the labeled document, the labeled document is associated with a first cluster and the particular document is associated with a second cluster, and wherein the particular document is selected further based on a determination that a quantity of labeled documents in the second cluster fails to satisfy a threshold.

13. The method of claim 12, wherein the quantity of labeled documents is a count of labeled documents or a density of labeled documents in the feature vector space.

14. The method of claim 1, wherein the labeled document and the particular document are associated with a first cluster and wherein the distance between the particular document and the labeled document indicates a number of hops within the first cluster linking the particular document and the labeled document.

15. The method of claim 1, further comprising, before performing the clustering operation, receiving, via a graphical user interface including a plurality of document elements and a plurality of class elements, user input to generate a portion of classification data corresponding to the one or more labeled documents by associating one or more document elements of the plurality of document elements with corresponding class elements of the plurality of class elements.

16. The method of claim 1, further comprising:
after the trained file classifier is put into use to classify the second document corpus, determining that a rebuild condition is satisfied;
accessing second supervised training data, the second supervised training data including manually labeled documents classified after the trained file classifier is put into use;
generating a second trained file classifier using the machine learning based on the second supervised training data set; and
storing, by the computing device, the second trained file classifier for use in classifying a third document corpus that is related to the second document corpus.

17. The method of claim 1, wherein the input responsive to the prompt identifies a new cluster label.

18. The method of claim 1, further comprising:
after receiving the input responsive to the prompt, determining, with the computing device, an adjusted cluster center for at least one of the clusters; and
wherein the trained file classifier is generated based further on the adjusted cluster center.

19. The method of claim 18, further comprising:
after determining the adjusted cluster center, generating, by the computing device, a second prompt requesting classification of a second particular document of the one or more unlabeled documents, wherein the second particular document is selected based on a distance between the second particular document and the adjusted cluster center.

20. The method of claim 1 wherein the feature vector space comprises a plurality of dimensions, with each dimension corresponding to a document vector field.

21. The method of claim 1, wherein the particular document is selected for the manual classification based on the number of labeled documents in the cluster associated with the particular document failing to satisfy the threshold.

22. The method of claim 1, wherein the particular document is selected for the manual classification based on the particular document being located in the feature vector space in a boundary region between two clusters.

23. A computing device comprising:
a memory storing document classifier generation instructions executable to generate a trained file classifier; and
a processor configured to execute instructions from the memory, wherein the document classifier generation instructions are executable by the processor to perform operations comprising:
performing, by a computing device, a clustering operation to group at least a subset of documents of a first document corpus into clusters in a feature vector space, the first document corpus including one or more labeled documents and one or more unlabeled documents, wherein each of the one or more labeled documents is assigned to a corresponding class in classification data associated with the first document corpus and wherein each of the one or more unlabeled document is not assigned to any class in the classification data;
after performing the clustering operation, selecting a particular document of the one or more unlabeled documents for manual classification based on a number of labeled documents in a cluster associated with the particular document failing to satisfy a threshold or based on the particular document being located in the feature vector space in a boundary region between two clusters, wherein the manual classification of the particular document is expected to facilitate training of the trained file classifier based on a distance in the feature vector space between the particular document and a labeled document of the one or more labeled documents;
generating, by the computing device, a prompt requesting the manual classification of the particular document of the one or more unlabeled documents;
assigning a particular label to the particular document based on input responsive to the prompt;
after assigning the particular label to the particular document, generating the trained file classifier using machine learning based on a supervised training data set that includes the one or more labeled documents and the particular document; and
storing, by the computing device, the trained file classifier for use in classifying a second document corpus that is related to the first document corpus.

24. The computing device of claim 23, wherein generating the trained file classifier comprises:
generating a plurality of preliminary classifiers using two or more different machine learning techniques;
determining performance metrics for the plurality of preliminary classifiers using a test portion of the supervised training data; and
selecting the trained file classifier from among the plurality of preliminary classifiers based on the performance metrics.

25. The computing device of claim 23, wherein, after performing the clustering operation, the labeled document is associated with a first cluster and the particular document is associated with a second cluster based on the distance between the particular document and the labeled document, and wherein the particular document is selected further based a determination that the second cluster includes fewer than a threshold number of labeled documents.

26. A computer readable storage device storing instructions that are executable by a processor to perform operations comprising:
performing, by a computing device, a clustering operation to group at least a subset of documents of a first document corpus into clusters in a feature vector space, the feature vector space comprising a plurality of dimensions, with each dimension corresponding to a document vector field, the first document corpus including one or more labeled documents and one or more unlabeled documents, wherein each of the one or more labeled documents is assigned to a corresponding class in classification data associated with the first document corpus and wherein each of the one or more unlabeled documents is not assigned to any class in the classification data; and after performing the clustering operation, selecting a particular document of the one or more unlabeled documents for manual classification based on a number of labeled documents in a cluster associated with the particular document failing to satisfy a threshold or based on the particular document being located in the feature vector space in a boundary region between two clusters, wherein the manual classification of the particular document is expected to facilitate training of a trained file classifier based on a distance in the feature vector space between the particular document and a labeled document of the one or more labeled documents;

generating, by the computing device, a prompt requesting the manual classification of the particular document of the one or more unlabeled documents;

after generating the prompt, receiving user input, at the computing device, classifying the particular document;

after receiving the user input, generating the trained file classifier using machine learning based on a supervised training data set that includes the one or more labeled documents and the particular document; and storing the trained file classifier for use in classifying a second document corpus that is related to the first document corpus.

27. The computer readable storage device of claim 26, wherein the clustering operation comprises a connectivity clustering operation, a centroid clustering operation, a density clustering operation, or a distribution clustering operation.

* * * * *